United States Patent
Wu et al.

(10) Patent No.: US 6,330,623 B1
(45) Date of Patent: Dec. 11, 2001

(54) SYSTEM AND METHOD FOR MAXIMIZING DMA TRANSFERS OF ARBITRARILY ALIGNED DATA

(75) Inventors: Shih-ho Wu, Mesa; David Ross Evoy, Tempe, both of AZ (US)

(73) Assignee: VLSI Technology, Inc., San Jose, CA (US)

(*) Notice: Subject to any disclaimer, the term of this patent is extended or adjusted under 35 U.S.C. 154(b) by 0 days.

(21) Appl. No.: 09/227,122

(22) Filed: Jan. 8, 1999

(51) Int. Cl.[7] ................................................. G06F 13/28
(52) U.S. Cl. ................................ 710/23; 710/33; 711/201
(58) Field of Search .................................. 710/22, 23, 24, 710/26, 33–35, 52; 711/200, 201

(56) References Cited

U.S. PATENT DOCUMENTS

| | | | |
|---|---|---|---|
| 5,542,053 | 7/1996 | Bland et al. | 395/309 |
| 5,708,849 | 1/1998 | Coke et al. | 395/842 |
| 5,812,976 | 9/1998 | Ryan | 704/201 |
| 5,894,560 | * 4/1999 | Carmichael et al. | 710/25 |
| 5,898,891 | * 4/1999 | Meyer | 710/33 |
| 5,901,291 | * 5/1999 | Feeney et al. | 709/253 |
| 6,076,180 | * 6/2000 | Meyer | 714/742 |

FOREIGN PATENT DOCUMENTS

| | | | |
|---|---|---|---|
| 732659A1 | 9/1996 | (EP) | G06F/13/28 |
| 537401-A1 | * 4/1993 | (EP) | G06F/15/16 |

OTHER PUBLICATIONS

IBM Technical Disclosure Bulletin—"Variable–Length Data Assembler" Oct. 1976—vol. 9, No. 5–p. 1892–1895.*
IBM Technical Disclosure Bulletin—"DMA Controller Channel Interloking"—Jan. 1994—vol. 37, No. 01–p. 337–341.*

* cited by examiner

Primary Examiner—Thomas Lee
Assistant Examiner—Thuan Du
(74) Attorney, Agent, or Firm—Wagner, Murabito & Hao LLP

(57) ABSTRACT

A direct memory access engine (DMA) system and method for maximizing DMA transfers of arbitrarily aligned data. The present invention utilizes physical region descriptors (PRD) stored in memory to track locations and descriptions of scattered data in a main memory. The direct memory access circuit retrieves the data in accordance with the PRD and configures the data into pieces such that intermediate pieces of data between a first piece and a last piece are the maximum amount of information a communication burst is capable of transferring and the intermediate pieces of data are aligned to a natural boundary address. The DMA engine also communicates the first piece of data and the last piece of data in a manner that minimizes memory accesses and in transfer sizes that are compatible with requirements and limitations of a system in which DMA engine is implemented. The DMA rotates bytes of the data to compensate for misalignment between a source address and a destination address and merges the data into a concatenated stream.

11 Claims, 43 Drawing Sheets

310

| PCM data in SDRAM | Data from SDRAM | Data to Audio device | |
|---|---|---|---|
| Sector 1 0101,0000-0101,07FF | 0101,0023-0101,07FF | 0200,0000-0200,07DC | count = 7DD |
| Sector 2 0101,0800-0101,0FFF | 0101,0823-0101,0FFF | 0200,07DD-0200,0FB9 | count = 7DD |
| Sector 3 0105,0000-0105,07FF | 0105,0023-0105,07FF | 0200,0FBA-0200,1796 | |
| Sector 4 0105,0800-0105,0FFF | 0105,0823-0105,0FFF | 0200,1797-0200,1F73 | |
| Sector 5 0103,0000-0103,07FF | 0103,0023-0103,07FF | 0200,1F74-0200,2750 | count = 7DD |
| Sector 6 0104,0800-0104,08AE | 0104,0823-0104,08D2 | 0200,2751-0200,27FF | count AF |

| address | data |
|---|---|
| 0300,0000 | 0101,0023; start of first sector data payload |
| 0300,0004 | 0000,07DD; length of payload in this sector |
| 0300,0008 | 0101,0823; start of sector 2 data payload |
| 0300,000C | 0000,07DD; length of payload in this sector |
| 0300,0010 | 0105,0023; start of sector 3 data payload |
| 0300,0014 | 0000,07DD; length of payload in this sector |
| 0300,0018 | 0105,0823; start of sector 4 data payload |
| 0300,001C | 0000,07DD; length of payload in this sector |
| 0300,0020 | 0103,0023; start of sector 5 data payload |
| 0300,0024 | 0000,07DD; length of payload in this sector |
| 0300,0028 | 0104,0823; start of sector 6 data payload |
| 0300,002C | 8000,00AF; length of payload in this sector, with EOF flag set to a 1 |

| 410 | 420 | 430 | 440 |
|---|---|---|---|
| Position 7 | Position 15 | Position 23 | Position 31 |
| Position 6 | Position 14 | Position 22 | Position 30 |
| Position 5 | Position 13 | Position 21 | Position 29 |
| Position 4 | Position 12 | Position 20 | Position 28 |
| Position 3 | Position 11 | Position 19 | Position 27 |
| Position 2 | Position 10 | Position 18 | Position 26 |
| Position 1 | Position 9 | Position 17 | Position 25 |
| Position 0 | Position 8 | Position 16 | Position 24 |

FIG. 4

SH4 INTERFACE & I/O PADS TABLE

| Name | In/Out | Description |
|---|---|---|
| gdma_ado(63:0) | out | The 64-bit output data to the SH4 interface block. This is the data output to the SDRAM for scatter operation. |
| sh_dataout(63:0) | in | This is the SH4 data input from the SH4 interface input registers. It is input into the GDMA's internal buffer for fetching PRD and for gather operation. |
| gdma_sel_ado_n | out | An active low signal that tells the SH4 interface to output the gdma_ado(63:0) onto the AD bus. |
| xt_tdack_n | in | SH4 TDACK_N signal. It means begin receiving data this sh4_clk or send data next cycle. This signal is straight from pad. It is registered internally in order to be in step with the registered AD data. |
| xt_id(1:0) | in | In DDT mode these bits indicate which DMA channel the current xt_tdack_n is for. These bits only have meaning when xt_tdack_n is active. They are registered internally as the xt_tdack_n. These bits are used by the GDMA to determine whether the current SH4 TDACK_N is for CH0 DDT. |
| xt_hclk | in | The SH4 clock. This clock is used by the main GDMA state machine. |
| size_64 | in | This bit tells the GDMA whether the external SDRAM data bus is 64-bit or 32-bit. A '1' indicates a 64-bit bus. This information is needed to set up the GDMA datapath. |

INTERRUPT CONTROLLER INTERFACE TABLE

| Name | In/Out | Description |
|---|---|---|
| gdma_int_n(5:0) | out | The six active low GDMA channel interrupt outputs to the interrupt controller. Each channel's interrupt line is set to a '0' when it completes the transfer of a block of data whose PRD has a '1' in its EOT field. Software has to clear the interrupt lines by writing to the GDMAINT register. |

DDT INTERFACE TABLE

| Name | In/Out | Description |
|---|---|---|
| gdma_dtr(47:0) | out | The 48-bit DTR data to the DDT block.<br>gdma_dtr(47:45) - Transfer size SZ(2:0) of the SH4 DTR.<br>gdma_dtr(44) - R/W: 0 - read from SDRAM, 1 - write to SDRAM.<br>gdma_dtr(43:32) - Channel ID ID(1:0) of the SH4 DTR. They are hard wired to "00" since the DMA channel 0 of the SH4 is used for scatter and gather.<br>gdma_dtr(41:40) - Transfer request mode MD(1:0) of the SH4 DTR. They are hard wired to "01."<br>gdma_dtr(39:32) - Transfer count COUNT(7:0) of the SH4 DTR.<br>gdma_dtr(31:0) - 32-bit starting address for the DDT transfer. |
| gdma_ddt_req_n | out | Active low DDT service request to the DDT block. This signal will remain low until the GDMA has gotten or sent all the data it requested. This signal will be de-asserted for at least one SH4 clock. |
| ddt_ack_gdma_n | in | ACK from the DDT block for the DDT service request issued by the GDMA. It means that the GDMA DDT request has been sent to the SH4. The GDMA will then wait for xt_tdack_n and qualifies it with the channel ID xt_id(1:0) to determine when to send the data or to get the data from the SDRAM.<br>The ddt_ack_gdma_n is a one-SH4-clock-wide pulse. |

PCI INTERFACE TABLE

| Name | In/Out | Description |
|---|---|---|
| ip_clk | in | Internal PCI Clock. |
| ip_grst_n | in | Active low internal PCI bus reset. The assertion of this signal is asynchronous and the de-assertion is sychronous to the ip_clk rising edge. The de-assertion is also internally synchronized to the xt_hclk to reset logic running in the SH4 clock zone. |
| gdma_req_n | out | When = '0' the GDMA is requesting the use of the internal PCI bus. |
| pa_gnt_e_n | in | Grant from the IPCI arbiter. When = '0' the GDMA is granted the internal PCI bus. |
| ip_ad(31:0) | in out | 32-bit address/data bus for the internal PCI bus. |
| ip_cbe_n(3:0) | in out | 4-bit PCI command/byte enable for the internal PCI BUS. |
| ip_frame_n | in | FRAME_N for the Internal PCI bus. |
| ip_irdy_n | in | IRDY_N for the Internal PCI bus. |
| ip_trdy_n | in | TRDY_N for the Internal PCI bus. |
| ip_stop_n | in | STOP_N for the Internal PCI bus. |
| ip_devsel_n | in | DEVSEL_N for the Internal PCI bus. |
| gdma_frame_n | out | FRAME_N driven by the GDMA. This signal defines the frame for the internal PCI bus when GDMA is granted the bus. |
| gdma_irdy_in | out | IRDY_N returned by the GDMA when it is the master for the current PCI transaction. |
| gdma_trdy_n | out | TRDY_N returned by the GDMA when it is the target for the current PCI transaction. |
| gdma_stop_n | out | STOP_N returned by the GDMA when it is the target for the current PCI transaction. (MAY NOT BE NEEDED) |
| gdma_devsel_n | out | DEVSEL_N returned by the GDMA when it is the target for the current PCI transaction. |

ADDRESSES FOR GDMA REGISTERS

| Address | Name | Register | Register Access |
|---|---|---|---|
| 04A60000H | | Current_Ch(test only) | RO |
| 04A60001H | | Next_Ch | RO |
| 04A60002H-04A6000FH | | unused | |
| 04A60020H | GDMACMD0 | GDMA Command Register 0 | R/W |
| 04A60021H | GDMATHR0 | GDMA Throttle Register 0 | R/W |
| 04A60022H | GDMASTAT0 | GDMA Status Register 0 | R/W |
| 04A60023H | | unused | |
| 04A60024H-04A60027H | GDMAPTR0 | GDMA PRD Table Address Register 0 | R/W |
| 04A60028H-04A6002BH | GDMADEV0 | GDMA Device Memory Address Register 0 | R/W |
| 04A6002CH-04A6002FH | GDMASDA0 | GDMA SDRAM Address 0 | RO |
| 04A60030H-04A60033H | GDMACNT0 | GDMA Remaining Transfer Count 0 | RO |
| 04A60034H-04A6003FH | | unused | |
| 04A60040H | GDMACMD1 | GDMA Command Register 1 | R/W |
| 04A60041H | GDMATHR1 | GDMA Throttle Register 1 | R/W |
| 04A60042H | GDMASTAT1 | GDMA Status Register 1 | R/W |
| 04A60043H | | unused | |
| 04A60044H-04A60047H | GDMAPTR1 | GDMA PRD Table Address Register 1 | R/W |
| 04A60048H-04A6004BH | GDMADEV1 | GDMA Device Memory Address Register 1 | R/W |
| 04A6004CH-04A6004FH | GDMASDA1 | GDMA SDRAM Address 1 | RO |
| 04A60050H-04A60053H | GDMACNT1 | GDMA Remaining Transfer Count 1 | RO |
| 04A60054H-04A6005FH | | unused | |
| 04A60060H | GDMACMD2 | GDMA Command Register 2 | R/W |
| 04A60061H | GDMATHR2 | GDMA Throttle Register 2 | R/W |
| 04A60062H | GDMASTAT2 | GDMA Status Register 2 | R/W |
| 04A60063H | | unused | |
| 04A60064H-04A60067H | GDMAPTR2 | GDMA PRD Table Address Register 2 | R/W |
| 04A60068H-04A6006BH | GDMADEV2 | GDMA Device Memory Address Register 2 | R/W |
| 04A6006CH-04A6006FH | GDMASDA2 | GDMA SDRAM Address 2 | RO |
| 04A60070H-04A60073H | GDMACNT2 | GDMA Remaining Transfer Count 2 | RO |
| 04A60074H-04A6007FH | | unused | |

| Address | Name | Register | Register Access |
|---|---|---|---|
| 04A60080H | GDMACMD3 | GDMA Command Register 3 | R/W |
| 04A60081H | GDMATHR3 | GDMA Throttle Register 3 | R/W |
| 04A60082H | GDMASTAT3 | GDMA Status Register 3 | R/W |
| 04A60083H | | unused | |
| 04A60084H-04A60087H | GDMAPTR3 | GDMA PRD Table Address Register 3 | R/W |
| 04A60088H-04A6008BH | GDMADEV3 | GDMA Device Memory Address Register 3 | R/W |
| 04A6002CH-04A6008FH | GDMASDA4 | GDMA SDRAM Address 4 | RO |
| 04A60090H-04A60093H | GDMACNT4 | GDMA Remaining Transfer Count 4 | RO |
| 04A60094H-04A6009FH | | unused | |
| 04A600A0H | GDMACMD4 | GDMA Command Register 4 | R/W |
| 04A600A1H | GDMATHR4 | GDMA Throttle Register 4 | R/W |
| 04A600A2H | GDMASTAT4 | GDMA Status Register 4 | R/W |
| 04A600A3H | | unused | |
| 04A600A4H-04A600A7H | GDMAPTR4 | GDMA PRD Table Address Register 4 | R/W |
| 04A600A8H-04A600ABH | GDMADEV4 | GDMA Device Memory Address Register 4 | R/W |
| 04A600ACH-04A600AFH | GDMASDA5 | GDMA SDRAM Address 5 | RO |
| 04A600B0H-04A600B3H | GDMACNT5 | GDMA Remaining Transfer Count 5 | RO |
| 04A600B4H-04A600BFH | | unused | |
| 04A600C0H | GDMACMD5 | GDMA Command Register 5 | R/W |
| 04A600C1H | GDMATHR5 | GDMA Throttle Register 5 | R/W |
| 04A600C2H | GDMASTAT5 | GDMA Status Register 5 | R/W |
| 04A600C3H | | unused | |
| 04A600C4H-04A600C7H | GDMAPTR5 | GDMA PRD Table Address Register 5 | R/W |
| 04A600C8H-04A600CBH | GDMADEV5 | GDMA Device Memory Address Register 5 | R/W |
| 04A600CCH-04A600CFH | GDMASDA6 | GDMA SDRAM Address 6 | RO |
| 04A600D0H-04A600D3H | GDMACNT6 | GDMA Remaining Transfer Count 6 | RO |
| 04A600D4H-04A600DFH | | unused | |

FIG. 15B

GDMA CHANNELx COMMAND REGISTER (R/W)

| 04A60020h,<br>04A60040h,<br>04A60060h,<br>04A60080h,<br>04A600A0h,<br>04A600C0h, | D7 | D6 | D5 | D4 | D3 | D2 | D1 | D0 |
|---|---|---|---|---|---|---|---|---|
| GDMACMD[5:0] | R | R | R | R | DIR | R | FIXA | START |
| POR Value | 0 | 0 | 0 | 0 | 0 | 0 | 0 | 0 |

| Bit | Name | Function |
|---|---|---|
| 7:4 | R | Reserved. These bits always return zero. |
| 3 | DIR | Read or Write Control: This bit sets the direction of the bus master transfer. This bit must not be changed when the bus master function is active.<br>DIR = 0 will cause data transfers from SDRAM to GPCI.<br>DIR = 1 will cause data transfers from GPCI to SDRAM. |
| 2 | R | Reserved. These bits always return zero. |
| 1 | FIXA | This bit controls Auto increment / fixed device address.<br>FIXA = 1 will cause the device address to be fixed.<br>FIXA = 0 will cause the device address to autoincrement. |
| 0 | START | Start/Stop Bus Master: Writing a '1' to this bit enables bus master operation of the controller. Bus master operation begins when this bit is detected changing from a zero to a one. Master operation can be halted by writing a '0' to this bit. All state information is lost when a '0' is written; Master mode operation cannot be stopped and then resumed. |

FIG. 16

GDMA CHANNELx THROTTLE REGISTER (R/W)

| 04A60021h, 04A60041h, 04A60061h, 04A60081h, 04A600A1h, 04A600C1h, | D7 | D6 | D5 | D4 | D3 | D2 | D1 | D0 |
|---|---|---|---|---|---|---|---|---|
| GDMATHR[5:0] | R | R | R | R | THR[3:0] | | | |
| POR Value | 0 | 0 | 0 | 0 | 0 | 0 | 0 | 0 |

| Bit | Name | Function |
|---|---|---|
| 7:4 | R | Reserved. These bits always return zero. |
| 3:0 | THR[3:0] | Selects throttle level to pace the rate of DMA transfer for this channel. 0 = no delay, run at maximum rate. Values of 1 to 15 add delay between transfers and slow down the data transfer<br>THR = 15; transfer rate is throttled down to a maximum of 1.5Mbytes per second.<br>THR = 14; transfer rate is throttled down to a maximum of 3Mbytes per second.<br>THR = 13; transfer rate is throttled down to a maximum of 4.5Mbytes per second.<br>THR = 12; transfer rate is throttled down to a maximum of 6Mbytes per second.<br>THR = 11; transfer rate is throttled down to a maximum of 7.5Mbytes per second.<br>THR = 10; transfer rate is throttled down to a maximum of 9Mbytes per second.<br>THR = 9; transfer rate is throttled down to a maximum of 10.5Mbytes per second.<br>THR = 8; transfer rate is throttled down to a maximum of 12Mbytes per second.<br>THR = 7; transfer rate is throttled down to a maximum of 13.5Mbytes per second.<br>THR = 6; transfer rate is throttled down to a maximum of 15Mbytes per second.<br>THR = 5; transfer rate is throttled down to a maximum of 17.5Mbytes per second.<br>THR = 4; transfer rate is throttled down to a maximum of 19Mbytes per second.<br>THR = 3; transfer rate is throttled down to a maximum of 20.5Mbytes per second.<br>THR = 2; transfer rate is throttled down to a maximum of 22Mbytes per second.<br>THR = 1; transfer rate is throttled down to a maximum of 23.5Mbytes per second.<br>THR = 0; no throttle, this channel runs at a maximum available rate. |

FIG. 17

DMA CHANNELx STATUS REGISTER (R/W)

| 04A60022h, 04A60042h, 04A60062h, 04A60082h, 04A600A2h, 04A600C2h, | D7 | D6 | D5 | D4 | D3 | D2 | D1 | D0 |
|---|---|---|---|---|---|---|---|---|
| GDMASTAT[5:0] | R | R | R | R | R | INT | ERROR | ACTIVE |
| POR Value | 0 | 0 | 0 | 0 | 0 | 0 | 0 | 0 |

| Bit | Name | Function |
|---|---|---|
| 7 | R | Reserved. These bits always return zero. |
| 6 | R | Reserved. These bits always return zero. |
| 5 | R | Reserved. These bits always return zero. |
| 4:3 | R | Reserved. These bits always return zero. |
| 2 | INT | Interrupt: This bit is set by when this channel is done, that is when the EOT bit is set in the PRD or the ERROR bit is set. This bit can be cleared by software by writing a 0 to this bit. This bit may also be observed in the Global Interrupt register, see interrupt controller section. This bit is Read/Write. |
| 1 | ERROR | Error: This bit is set when the GDMA PCI master encounters either PCI target abort or master abort. When ERROR bit is set, the INT bit will be set and the START bit in the COMMAND register will be cleared. This bit is Read/Write. |
| 0 | ACTIVE | This bit is set when the Start bit is written to a one in the Command register. This bit is cleared when the last transfer for a region is performed, where EOT for that region is set in the region descriptor. It is also cleared when the Start bit is cleared in the Command register. This bit is Read only. |

FIG. 18

DMA CHANNELx - DESCRIPTOR TABLE POINTER REGISTER

| 04A60024h, 04A60044h, 04A60064h, 04A60084h, 04A600A4h, 04A600C4h, | D31 | D30 | D29 | D28 | D27 | D26 | D25 | D24 |
|---|---|---|---|---|---|---|---|---|
| GDMAPTR[5:0] | \multicolumn{8}{c}{PRDPTR[31:24]} | | | | | | | |
| POR Value | 0 | 0 | 0 | 0 | 0 | 0 | 0 | 0 |
| | D23 | D22 | D21 | D20 | D19 | D18 | D17 | D16 |
| | \multicolumn{8}{c}{PRDPTR[23:16]} | | | | | | | |
| | 0 | 0 | 0 | 0 | 0 | 0 | 0 | 0 |
| | D15 | D14 | D13 | D12 | D11 | D10 | D9 | D8 |
| | \multicolumn{8}{c}{PRDPTR[15:8]} | | | | | | | |
| | 0 | 0 | 0 | 0 | 0 | 0 | 0 | 0 |
| | D7 | D6 | D5 | D4 | D3 | D2 | D1 | D0 |
| | \multicolumn{6}{c}{PRDPTR[7:2]} | | | | | | 0 | 0 |
| | 0 | 0 | 0 | 0 | 0 | 0 | 0 | 0 |

| Bit | Name | Function |
|---|---|---|
| 31:0 | PRDPTR | Base Address of Descriptor Table. Corresponds to A[31:2]. |

FIG. 19

DMA CHANNELx - SDRAM ADDRESS

| 04A6002Ch, 04A6004Ch, 04A6006Ch, 04A6008Ch, 04A600ACh, 04A600CCh, | D31 | D30 | D29 | D28 | D27 | D26 | D25 | D24 |
|---|---|---|---|---|---|---|---|---|
| GDMASDA[5:0] | \multicolumn{8}{c}{GDMASDA[31:24]} | | | | | | | |
| POR Value | 0 | 0 | 0 | 0 | 0 | 0 | 0 | 0 |
| | D23 | D22 | D21 | D20 | D19 | D18 | D17 | D16 |
| | \multicolumn{8}{c}{GDMASDA[23:16]} | | | | | | | |
| | 0 | 0 | 0 | 0 | 0 | 0 | 0 | 0 |
| | D15 | D14 | D13 | D12 | D11 | D10 | D9 | D8 |
| | \multicolumn{8}{c}{GDMASDA[15:8]} | | | | | | | |
| | 0 | 0 | 0 | 0 | 0 | 0 | 0 | 0 |
| | D7 | D6 | D5 | D4 | D3 | D2 | D1 | D0 |
| | \multicolumn{8}{c}{GDMASDA[7:0]} | | | | | | | |
| | 0 | 0 | 0 | 0 | 0 | 0 | 0 | 0 |

| Bit | Name | Function |
|---|---|---|
| 31:0 | GDMASDA | Memory address A[31:0]. This is a Read Only register. It is initialized by the GDMA state machine by transferring the Memory Region Physical Base Address from the PRD to this register. When GMDACMD[x].DIR = 0, this address is a SDRAM source address. When GMDACMD[x].DIR = 1, this address is a memory destination address in SDRAM. This address always auto increments. This register is updated during GDMA transfers and contains the next address to be transferred. The address in the PRD in memory is not updated during the transfer. |

FIG. 20

DMA CHANNELx - DEVICE MEMORY ADDRESS REGISTER

| 04A60028h,<br>04A60048h,<br>04A60068h,<br>04A60088h,<br>04A600A8h,<br>04A600C8h, | D31 | D30 | D29 | D28 | D27 | D26 | D25 | D24 |
|---|---|---|---|---|---|---|---|---|
| GDMAA[5:0] | | | | GDMAA[31:24] | | | | |
| POR Value | 0 | 0 | 0 | 0 | 0 | 0 | 0 | 0 |
| | D23 | D22 | D21 | D20 | D19 | D18 | D17 | D16 |
| | | | | GDMAA[23:16] | | | | |
| | 0 | 0 | 0 | 0 | 0 | 0 | 0 | 0 |
| | D15 | D14 | D13 | D12 | D11 | D10 | D9 | D8 |
| | | | | GDMAA[15:8] | | | | |
| | 0 | 0 | 0 | 0 | 0 | 0 | 0 | 0 |
| | D7 | D6 | D5 | D4 | D3 | D2 | D1 | D0 |
| | | | | GDMAA[7:0] | | | | |
| | 0 | 0 | 0 | 0 | 0 | 0 | 0 | 0 |

| Bit | Name | Function |
|---|---|---|
| 31:0 | GDMAA | Memory address A[31:0]. When GMDACMD[x].DIR = 0, this address is a memory destination, generally in the G-PCI space. When GMDACMD[x].DIR = 1, this address is a memory source, generally in the G-PCI space. When GMDACMD[x].HLDA = 0, this address will auto increment. When GMDACMD[x].HLDA = 1, this address will remain constant for the entire transfer. |

FIG. 21

DMA CHANNELx - REMAINING TRANSFER COUNT

| 04A60030h,<br>04A60050h,<br>04A60070h,<br>04A60090h,<br>04A600B0h,<br>04A600D0h, | D31 | D30 | D29 | D28 | D27 | D26 | D25 | D24 |
|---|---|---|---|---|---|---|---|---|
| GDMACNT[5:0] | EOT | R | R | R | R | R | R | R |
| POR Value | 0 | 0 | 0 | 0 | 0 | 0 | 0 | 0 |
| | D23 | D22 | D21 | D20 | D19 | D18 | D17 | D16 |
| | R | R | R | R | R | R | R | R |
| | 0 | 0 | 0 | 0 | 0 | 0 | 0 | 0 |
| | D15 | D14 | D13 | D12 | D11 | D10 | D9 | D8 |
| | GDMACNT[15:8] | | | | | | | |
| | 0 | 0 | 0 | 0 | 0 | 0 | 0 | 0 |
| | D7 | D6 | D5 | D4 | D3 | D2 | D1 | D0 |
| | GDMACNT[7:0] | | | | | | | |
| | 0 | 0 | 0 | 0 | 0 | 0 | 1 | 0 |

| Bit | Name | Function |
|---|---|---|
| 31 | EOT | A one indicates that this channel has completed, (End Of Transfer). |
| 15:0 | GDMACNT | Remaining Transfer count A[15:0]. This is a Read Only register. It is initialized by the GDMA state machine by transferring the Byte Count from the PRD to this register. This address always decrements. This register is updated during GDMA transfers and contains the remaining byte count. The count in the PRD in memory is not updated during the transfer. |

FIG. 22

MUX SELECT FOR DATA ROTATION

| SOURCE ADDRESS | 00 | 01 | 10 | 11 |
|---|---|---|---|---|
| DESTINATION ADDRESS | MUX SELECT FOR DATA ROTATION | | | |
| 00 | 00 | 01* | 10* | 11* |
| 01 | 11 | 00 | 01* | 10* |
| 10 | 10 | 11 | 00 | 01* |
| 11 | 01 | 10 | 11 | 00 |

FIG. 24

SCATTER BUFFER DECOMPOSITION

SYSTEM AND METHOD FOR MAXIMIZING DMA TRANSFERS OF ARBITRARILY ALIGNED DATA

FIELD OF THE INVENTION

The present invention relates to the field of data communications to and from a main memory. More particularly, the present invention relates to a system and method for maximizing DMA transfers of arbitrarily aligned data.

BACKGROUND OF THE INVENTION

Electronic systems and circuits have made a significant contribution towards the advancement of modern society and are utilized in a number of applications to achieve advantageous results. Digital computers, calculators, audio devices, video equipment, telephone systems and a number of other electronic systems and circuits have facilitated increased productivity and reduced costs in a number of activities, including the analysis and communication of data, ideas and trends in most areas of business, science, education and entertainment. These electronic systems usually include a variety of components that communicate with each other in the performance of their prescribed tasks.

The speed and efficiency of communications between components of an electronic system are factors that can significantly impact performance of the system. For example, a number of different electronic systems incorporate components that rely on microprocessors to perform arithmetic operations, manipulate data, make decisions, and issue control commands related to the operations of the system. Virtually all microprocessor systems rely on a main memory to store instructions and information related to applications associated with the system or circuit. Efficient communication of information to and from the main memory impacts the ability of the microprocessor and other components in an electronic system or circuit to perform prescribed functions. There are numerous examples of electronic systems or circuits comprising components that depend upon efficient communications with a main memory component in order to operate properly.

FIG. 1 shows a schematic of one embodiment of a prior art computer system 100, one example of an electronic system that is impacted by constraints in the transfer of communications between it components. Computer graphics system 100 comprises a central processing unit (CPU) 101, a volatile main memory 102, graphics controller 103, non-volatile read only memory (ROM) 104, mass storage device 105, a signal input/output communication controller 106, keyboard 108, printer 109 and display monitor 110, all of which are coupled to bus 107. CPU 101 handles most of the control and data processing. Main memory 102 provides a convenient method of storing data for quick retrieval by CPU 101. Graphics controller 103 processes image data in pipelined stages. Non-volatile ROM 104 stores static information and instructions for CPU 101. Mass storage device 105 stores information associated with multiple images and applications. Signal input/output communication controller 106 controls external communications ports (not shown). Keyboard 108 operates as an input device. Printer 109 prints hard copies of graphical images and display monitor 110 displays graphical images. Bus 107 acts as a communication medium between the components.

Most electronic systems have certain access constraints that impact communications between devices in an electronic system. Transferring information to and from a device is usually governed by requirements based upon a combination of items such as the format of a media and/or allocation methods used by an operating system, etc. For example, main memory and bus protocols typically set alignment requirements a component (such as a direct memory access (DMA) engine or controller in the processor) that orchestrates transfers must contend with. Main memory and buses also usually dictate the minimum byte granularity or number of bytes that are transferred in each memory access and bus each cycle. In addition, a DMA is typically required to expend a certain minimum time establishing access with a main memory or a communication bus. These requirements often result in inefficiencies and delays in transferring information when a piece of data is not a size that is a multiple of the minimum granularity and not aligned to a natural boundary memory address that is a multiple of the minimum granularity. Typically these inefficiencies and delays adversely affect the performance of the electronic system or circuit.

The alignment of addresses in both the sending and receiving devices significantly affects data communications. Moving data between addresses (e.g. between a main memory and another device) that are aligned to an integer multiple of the same power of 2 as the maximum transfer size (e.g. 2048) is relatively straightforward. For example, these transfers are very efficient in systems with 32 byte transfer bursts because they consist of convenient data sizes (e.g. 2048) sent to nicely aligned addresses (e.g., some binary starting address with A[4:0] all set to zero). Moving the data to another memory address (e.g. in a main memory) that is not aligned to an integer multiple of the same power of 2 as the maximum transfer size (e.g. 32 bytes) is more difficult and typically results in communication delays. In addition, data transferred to and from mismatched positions in between natural address boundaries of a main memory and peripheral devices also increase communication delays.

In one example of an electronic system, data is bus mastered from a mass storage device into main memory, including all of the header information, and the payload data is transmitted from main memory to another device. A mass storage device usually comprises many types of data and is organized in sectors. For example, a digital video disk (DVD) usually includes audio, on-screen display (OSD), navigation packets and video data. A system including a DVD is typically required to move variable length data to any starting address in main memory. After the information has been bus mastered into a main memory a processor or controller then interrogates the header information to determine the type of data, the starting address, and the length of data in each of the sectors read from a mass storage memory (e.g., DVD). The processor or controller then moves the data payload to its destination. For example, audio data may be sent to a hardware device that assists in the decoding of the audio data and video data may be sent to a MPEG 2 video decoder. However, headers from the mass storage device are often non binary lengths and not usually transferred to the other devices. This leaves payload sizes that are nonbinary in length and less than a desirable multiple of the power of 2, making them an in convenient size for transmission.

Additional inefficiencies typically occur when a component that orchestrates accesses (e.g. a DMA engine or processor) to a main memory limits accesses to certain types of communication transfers. A data payload may be a byte count length the hardware does not support and therefore increases the difficulty in moving the data around in memory. In some electronic systems that include a synchronous dynamic random access memory (SDRAM) hardware limits access to specific types because of constraints inherent in SDRAMs and limitations of the SDRAM controller in a host processor. In these systems, accesses are usually limited to types such as a byte (8 bit), word (16 bit), double word (32 bit), long word (64 bit) or 32 byte burst (typically four 64 bit values in a single burst). By limiting accesses to certain types of communications transfers, other types of transfers are not supported efficiently. For example, a typical SDRAM system does not directly support 3 byte, 5 byte, 6 byte, 7 byte, and 9–31 byte transfers efficiently.

Communication inefficiencies can become further exacerbated in electronic systems that rely on information being transmitted in bursts of a specific length. Each transfer to or from a main memory typically has a relatively large overhead and not transferring the full capacity of a burst is very inefficient. For example, in a typical SDRAM system a 32 byte burst transfer full of relevant data uses the approximately the same amount of overhead as a 32 byte burst transfer comprising a single byte or relevant information except with the full 32 byte burst transfer a lot more information is conveyed in the payload. Smaller amounts of information communicated in each payload results in less efficient utilization of communication bandwidth.

Inefficient communication of information to and from devices usually has a substantial impact on the ability of an electronic system or circuit to perform its prescribed functions . Communication delays or inefficiencies are particularly detrimental in electronic systems or circuits that require data to "stream" smoothly. For example, most electronic systems or circuits that include a DVD have strenuous data movement requirements so that the different types of data such as audio and video flow in a sufficient stream to be perceived by human sense as continuous. If the data does not sufficiently flow in most electronic systems with DVD the systems will not operate properly and will not provide adequate results.

What is required is a system and method for conveniently and efficiently conveying information, including data that does not line up on a natural memory boundary or has mismatched byte alignments between a source and destination. The electronic system and method should be able to expediently communicate information and facilitate smooth streaming of data. The electronic system and method should ensure the information is properly aligned when the transfer is complete, including handling data alignment down to a byte boundary both at a source and a destination. The electronic system and method should minimize impacts due to access constraints of a media format or operating system memory allocation method and efficiently communicate data that is not a length directly supported by an electronic system's hardware. The electronic system should maximize utilization of available capacity in intermediate communication bursts between a first and last burst of a transfer and minimize the number of non optimal memory accesses.

SUMMARY OF THE INVENTION

The system and method of the present invention conveniently and efficiently conveys information between a source and destination, including data that does not line up on a natural memory boundary or has mismatched byte alignments. The present invention utilizes physical region descriptor (PRD) list s along with merging and rotation logic to expediently communicate information and facilitate smooth streaming of data. The DMA engine system and method of the present invention transfers data in accordance with proper alignment designations, including handling data alignment down to a byte boundary both at a source and a destination. Impacts due to access constraints of a media format or operating system memory allocation method are minimized and data that is not a length directly supported by an electronic system's hardware is efficiently communicated. The maximum capacity of intermediate communication bursts between a first and last communication burst are fully utilized and the number of adverse memory accesses are minimized in the first and last communication bursts of a transfer.

In one embodiment of the present invention a direct memory access engine implements scatter and gather operations to conveniently and efficiently transfer information between a source and destination, including data that does not line up on a natural memory boundary or has mismatched byte alignments. A memory storage device stores a list of PRDs that describe a starting address of a section of data and the amount of data stored in a contiguous space following the starting address. The direct memory access circuit utilizes the list of PRDs in the performance of scatter and gather data transfer operations. Scatter data transfer operations utilize a scatter buffer to facilitate the transfer of data to scattered locations in a main memory. Gather data transfer operations utilize a gather buffer to facilitate the gathering of data from scattered locations in a main memory. The direct memory access engine rotates and merges the gathered and scattered data. A data assembler rotates bytes of data to compensate for misalignment between a source address and a destination address and merges the data in a manner that delivers it in a concatenated stream.

DESCRIPTION OF THE DRAWINGS

The accompanying drawings which are incorporated in and form a part of this specification, illustrate embodiments of the invention and together with the description, serve to explain the principles of the invention:

FIG. 3A is an address table of audio linear pluse coded modulation (PCM) data in SDRAM main memory with headers included, addresses of PCM data in a SDRAM main memory without headers, and addresses in an audio device the information is to be transferred to.

FIG. 3B is a physical region descriptor (PRD) table of information in a PRD list related to the example transfer of PCM data to an audio device.

FIG. 4 is a block diagram illustrating one example of a 32 byte burst transfer.

FIG. 7 illustrates an example transfer in which there are more bytes of information in between the natural boundary addresses of 2n and 2n+3 in a source than available corresponding slots in between the natural boundary addresses of 2m and 2m+3 in a destination the information is being transmitted to.

FIG. 8 illustrates a transfer in which there are fewer bytes of information in between the natural boundary addresses of 2n and 2n+3 in a source than available slots in between the natural boundary addresses of 2m and 2m+3 in a destination the information is being transmitted to.

FIG. 10A is a one embodiment of an SH4 interface table that defines one embodiment of a DMA engine system interface with an SH4 interface block.

FIG. 11A is a one embodiment of an SH4 interface table that defines one embodiment of a DMA engine system interface with an interrupt controller.

FIG. 11B is a one embodiment of a SH4 interface table that defines one embodiment of a DMA engine system interface with a demand data transfer (DDT) interface block.

FIG. 12 is a one embodiment of a SH4 interface table that defines one embodiment of a DMA engine system interface with an internal PCI bus and internal PCI bus arbiter.

FIGS. 15A–B represent a table of addresses for DMA control registers in an embodiment in which there are six sets of command (GDMACMD) registers, throttle (GDMATHR) registers, status (GDMASTAT) registers, PRD list pointer (GDMAPTR) registers, main memory (GDMASDA) registers, device address (GDMADEV) registers and transfer count (GDMACNT) registers.

FIG. 16 is a table illustrating the configuration of bits in one embodiment of a GDMACMD register.

FIG. 17 is a table showing the configuration of bits in one embodiment of a GDMATHR register.

FIG. 18 is a table indicating the bit arrangement in one embodiment of a GDMASTAT register.

FIG. 19 is a table illustrating the arrangement of bits in one embodiment of a GDMAPTR register.

FIG. 20 is a table illustrating the configuration of bits in one embodiment of a GDMASDA register.

FIG. 21 is a table illustrating the configuration of bits in one embodiment of a GDMADEV register.

FIG. 22 is a table illustrating the configuration of bits in one embodiment of a GDMACNT register.

FIG. 24 is a table of the logic used to determine select signals for multiplexes included in a data assembler.

FIG. 41 is a flow chart illustrating one embodiment of a scatter buffer decomposition method of the present invention.

BEST MODE FOR CARRYING OUT THE INVENTION

Reference will now be made in detail to the preferred embodiments of the invention, a system and method for maximizing DMA transfers of arbitrarily aligned data, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention comprises a system and method that implements scatter and gather operations to conveniently and efficiently transfer information between a source and destination, including data that does not line up on a natural memory boundary or has mismatched byte alignments. In one embodiment the present invention utilizes physical region descriptor (PRD) lists along with merging and rotation logic to expediently communicate information and facilitate smooth streaming of data. The electronic system and method of the present invention maximizes utilization of available capacity of intermediate communication bursts. It also minimizes the number of adverse memory accesses when data is not a length directly supported by an electronic system's hardware. The present invention is capable of transferring the data to a byte boundary alignment at both a source and a destination.

Figure 1:
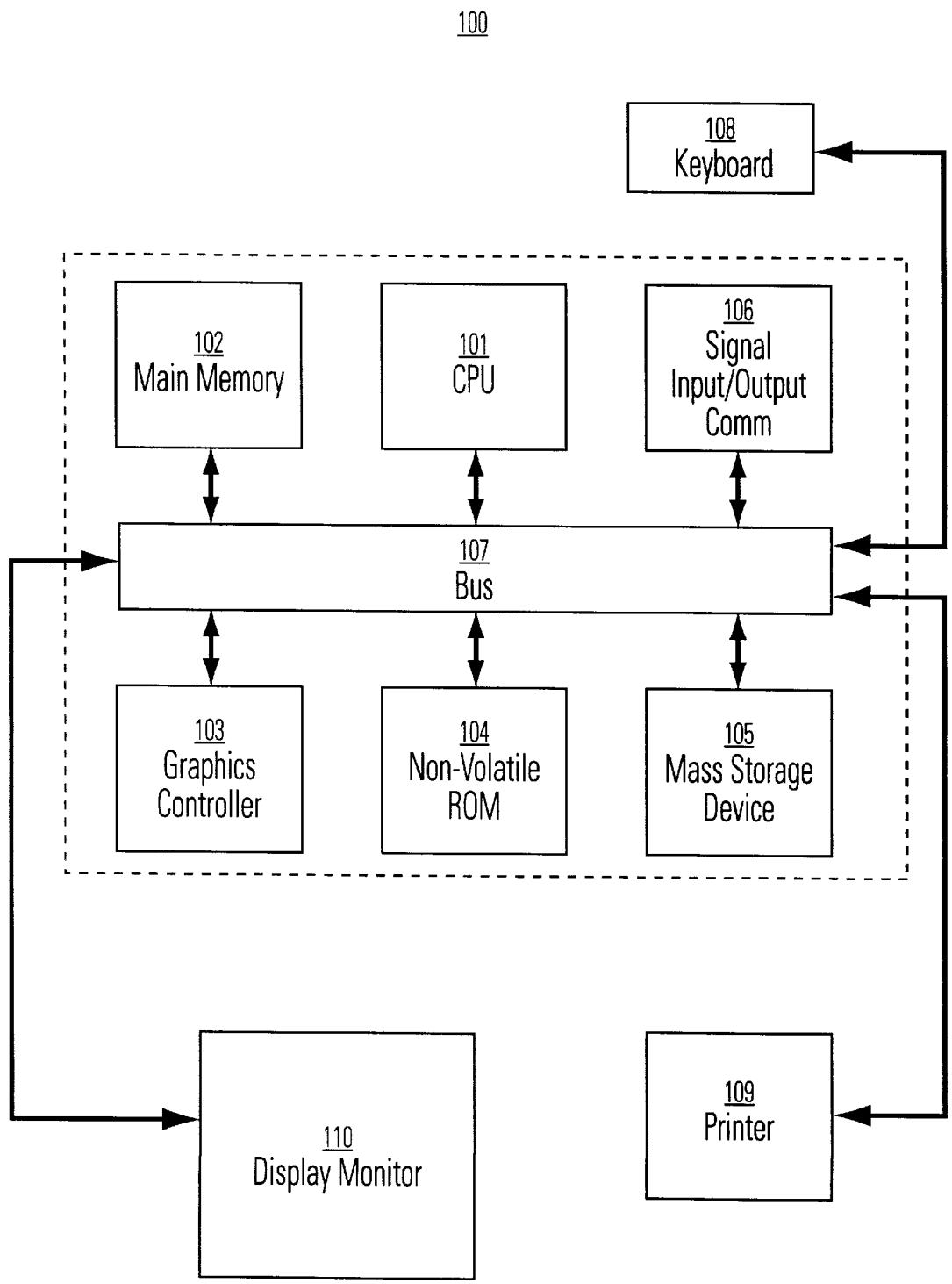
FIG. 1 shows a schematic of one embodiment of a prior art electronic system that is impacted by constraints in the transfer of communications between it components.
Figure 2:
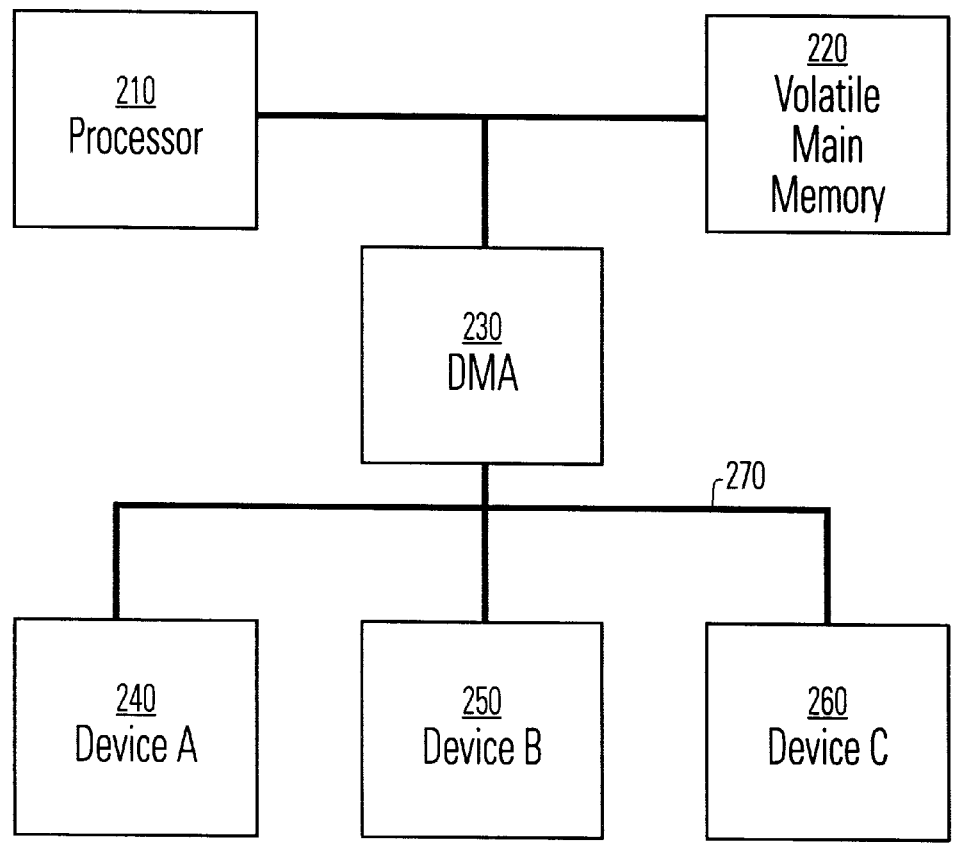
FIG. 2 is a block diagram of a direct memory access (DMA) system embodiment of the present invention.

FIG. 2 is a block diagram of one embodiment of the present invention, direct memory access (DMA) system 200. DMA system 200 comprises microprocessor 210, volatile main memory 220, DMA engine 230, device A 240, device B 250 and device C 260 and communication medium 270. Communication medium 270 is coupled to microprocessor 210, volatile main memory 220, DMA engine circuitry 230, device A 240, device B 250 and device C 260. Communication medium 270 provides a communication path between the components it is coupled to. In one embodiment of the present invention, main memory 220 is a SDRAM and device A 240 is a mass memory storage device such as a DVD, device B 250 is an audio device and device C 260 is a video device.

DMA engine 230 ensures that information is communicated to and from volatile main memory 220 in an efficient manner. DMA engine 230 minimizes the number of memory accesses required to transfer information not aligned on a natural boundary of volatile main memory 220 and provides smooth streaming of the data. It also improves transfer efficiency of data that are a size that is not directly supported by hardware of DMA system 200 by conveying the information in configurations that minimize the number accesses required to make a transfer.

In one embodiment of DMA system 200, multiple lists of transfer requests are utilized to facilitate the efficient movement of different types of information to and from volatile main memory 220. Each list includes physical region descriptors (PRDs) that describe a physical region in volatile main memory 220 and is used to support one type of data (e.g., audio, video, etc.). Each PRD includes a starting address, including any alignment for the start address and a count (length) of bytes of transfer data from continuous memory locations following the start address (e.g., from 1 to 65536 bytes). In one embodiment of the present invention, host processor 210 builds a list of PRDs that DMA engine 230 processes to move the payload portions of information from a source device (e.g., device A 240) to an appropriate destination device (e.g. device B 250) with all the data of any single type concatenated into a single stream. In both directions of communication byte alignment and byte granularity is fully supported.

FIG. 3A and FIG. 3B are transfer information tables that illustrate addresses and data involved in an example of an information transfer from an audio linear PCM in a DVD to an audio device via a SDRAM main memory. The DVD information is arranged in sectors with 35 bytes of overhead and 2013 bytes of payload. The audio device receives the DVD information minus the header. In this example, information from the DVD mass storage device is bus mastered into a SDRAM main memory. FIG. 3A is an address table 310 comprising addresses of PCM data in SDRAM main memory with headers included in column 311, addresses of PCM data in a SDRAM main memory without header in column 312 and addresses in an audio device the information is to be transferred to in column 313. The information starts at location 0100,0000 in the SDRAM and is sent (minus DVD headers) to a memory mapped audio device starting at address 0200,000.

FIG. 3B is a PRD table 320 of information in a PRD list related to the example transfer of PCM data to the audio device. Table 320 comprises column 321 that includes the address of a cell in SDRAM that includes the information in column 322. Column 322 includes information related to the data associated with the example transfer and temporarily stored in the SDRAM. In example table 320, the starting address of the PRD list is 0300,0000 and each PRD entry is 8 bytes in length. The first 4 bytes specify the byte address of a physical memory region of data without header information and the next 2 bytes specify the count of the region in bytes (e.g., 64K byte limit per region).

A PRD list of the present invention also allows a DMA engine system of the present invention to transfer data to scattered addresses and gather data from scattered addresses into contiguous streams. For example, the present invention is capable of accessing fragments of information in a SDRAM and delivering the information to a linear memory space of a fixed memory location (e.g., a memory location in an audio device). This invention also provides a complementary function that transfers data from a linear memory space of a fixed memory location to a burst SDRAM subsystem that is fragmented. In one embodiment of the present invention the data that is in nicely aligned locations of a DVD drive are scattered throughout a main memory SDRAM location in a manner that can be very arbitrary depending upon available storage space at any given time. As the data is transferred to the scattered locations in the main memory a PRD list is created that keeps track of the scattered locations. When the data is later moved from the main memory SDRAM to another device the PRD list is used to move a portion of each sector to a contiguous space or address in the other device.

Figures 1, 2, 3, 4, 5, 6, 7, 8, 9, 10, 11, 12, 13, 14, 15, 16, 17, 41:
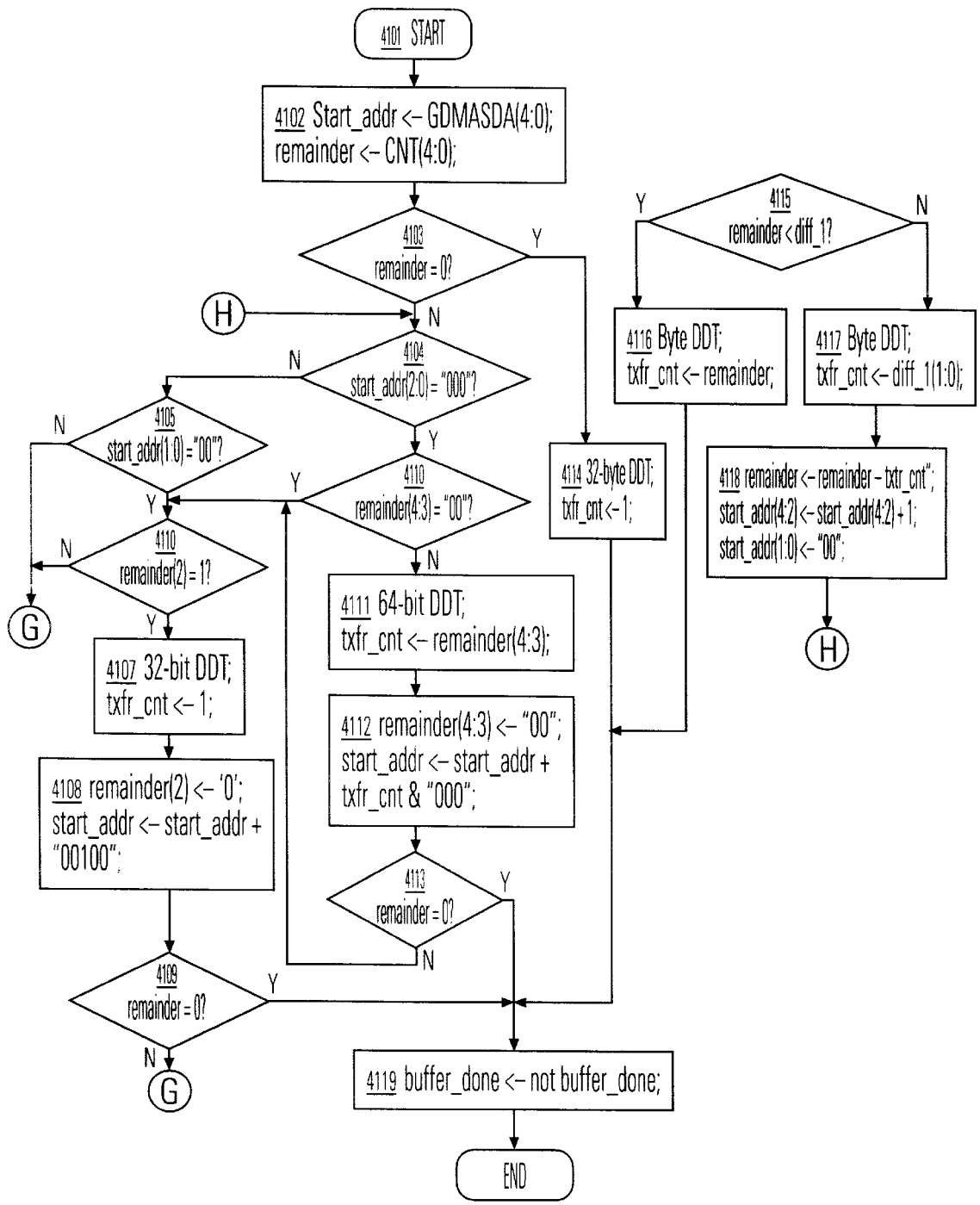

In one embodiment of a DMA engine system of the present invention communications are transmitted in bursts and the present invention configures data so that it is aligned to optimally utilize the maximum capacity size of a burst transfer. For example, in one embodiment the present invention is implemented in a system that includes an SH4 SDRAM controller that configures the information to be transmitted in 32 byte bursts. FIG. 4 is a block diagram illustrating one example of a 32 byte burst transfer 400. Burst transfer 400 comprises positions 0 to 31 for a total of 32 positions with a capacity of one byte in each position. The positions are arranged in 4 columns (410, 420, 430, 440) each comprising eight positions.

Figure 5:
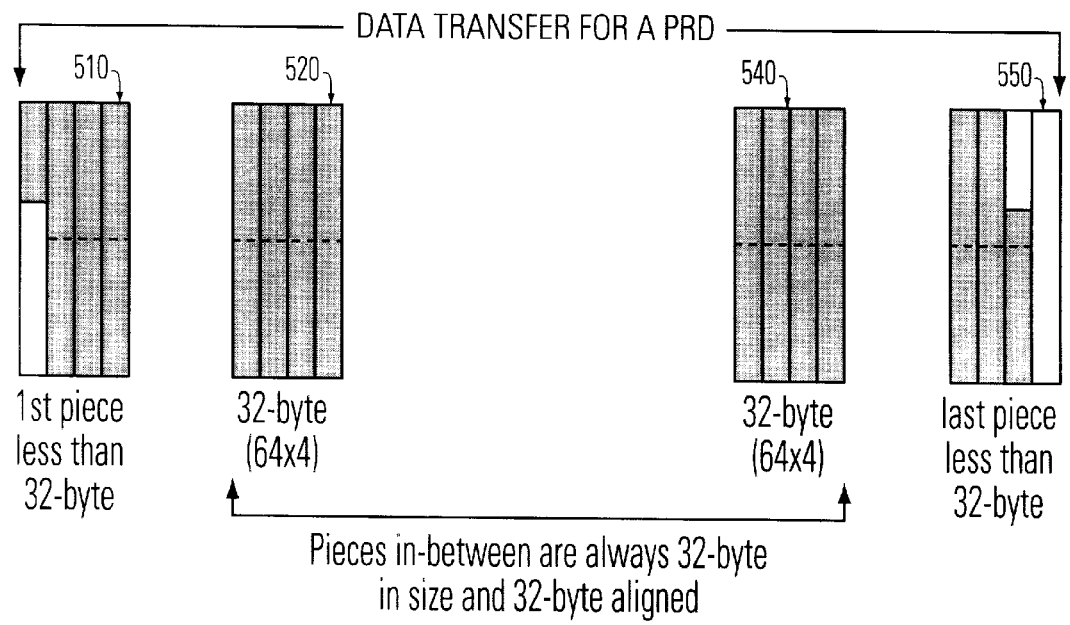
FIG. 5 illustrates the break down of non 32 byte aligned SDRAM addresses into less than a 32 byte burst at the beginning and at the end of a transaction and 32 byte aligned 32 byte bursts in between the first piece and last piece.

The present invention enables a DMA or controller to be more efficient in dealing with situations in which the total data to be transferred is greater than a maximum burst size and it does not start on an address byte boundary that is a multiple of the maximum burst size. For non 32 byte aligned SDRAM addresses, data transfers are broken up into unaligned less than 32 byte burst at the beginning and at the end and 32 byte aligned 32 byte bursts in between, as shown in FIG. 5. Burst 510 starts at position 5 and comprises 27 bytes and burst 550 comprises 29 bytes filling up to position 28. Bursts in between burst 510 and 550 such as burst 520 and 540 comprise bursts of 32 bytes each and start at position 0. Depending on the starting address and the byte count included in a PRD, a transfer could have 32 byte aligned 32 byte first and last burst, or a less than 32 byte first bust or last piece, or less than 32 byte bursts at both ends. Regardless of the configuration, the present invention is applicable to system specifications requiring the GDMA to handle data alignment down to a byte boundary, both at a source and at a destination.

The present invention also provides data rotation and merging that compensate for mismatched positions in a group of bytes transferred in a bus cycle between a source and destination. The data rotation and merging also facilitates the configuration of bursts in between a first and last burst so that they filled to capacity. A data assembler of the present invention provides these rotation and merging functions while enhancing data streaming. In one embodiment of the present invention the data assembler comprises rotation/ merging logic and staging registers that have a capacity of one byte. The number of staging registers is determined by the width of an associated internal bus over which the information flows. For example, if the number of bytes transmitted over an internal bus in one cycle is a group of K bytes then K minus 1 equals the number of staging registers required to perform an appropriate data rotation and merge. If a group of K bytes is being transmitted and they line up on a natural boundary address or in the same group positions on both a source and destination side of a transmission, they are transmitted directly across without going through the staging registers. A natural boundary address in one embodiment is $2^x$ where x is a variable integer such that 2 to the power of X equals a multiple of K bytes. If the transmission does not line up on a natural K byte boundary address or in the same group positions in either the source or destination or both, the information is transmitted through the staging registers.

In a situation where the transmission does not line up on a natural boundary address that is a multiple of K bytes or same group position slots and there are more bytes of information between natural boundary addresses in a source than slots between corresponding natural boundaries of the destination the information is being transmitted to, then as many bytes as possible are transmitted directly through to the destination slots and the remaining information is transmitted to the staging registers during a first transmission cycle. The staging register essentially stores the excess information for one cycle and then transmits it to the destination during the next transmission cycle. If there is also another group of source information to be transmitted during the next cycle, as many bytes as possible are transmitted to fill up available space between natural boundaries in the destination not filled by the bytes of information in the staging registers and remaining new bytes of information are sent to staging registers. The transfers continue until all the information has been transmitted and there is no information to be transferred remaining in the staging registers or source.

If there are fewer bytes of information between natural boundaries addresses of the source than available slots between corresponding natural boundary addresses of a destination the information is being transmitted to, then the bytes of information between the initial natural boundary addresses of the source are transmitted to the staging registers during a first transmission cycle. In the next cycle the information in the staging registers is transferred to available slots in the destination. If there are any remaining slots available in between the natural boundary addresses of the destination they are filled with information from the next group of bytes from the source. If the next group of bytes from the source has any remaining bytes they are transmitted to the staging registers. Again, the transfers continue until all the information has been transmitted and there is no information to be transferred remaining in the staging registers or source.

Figure 6:
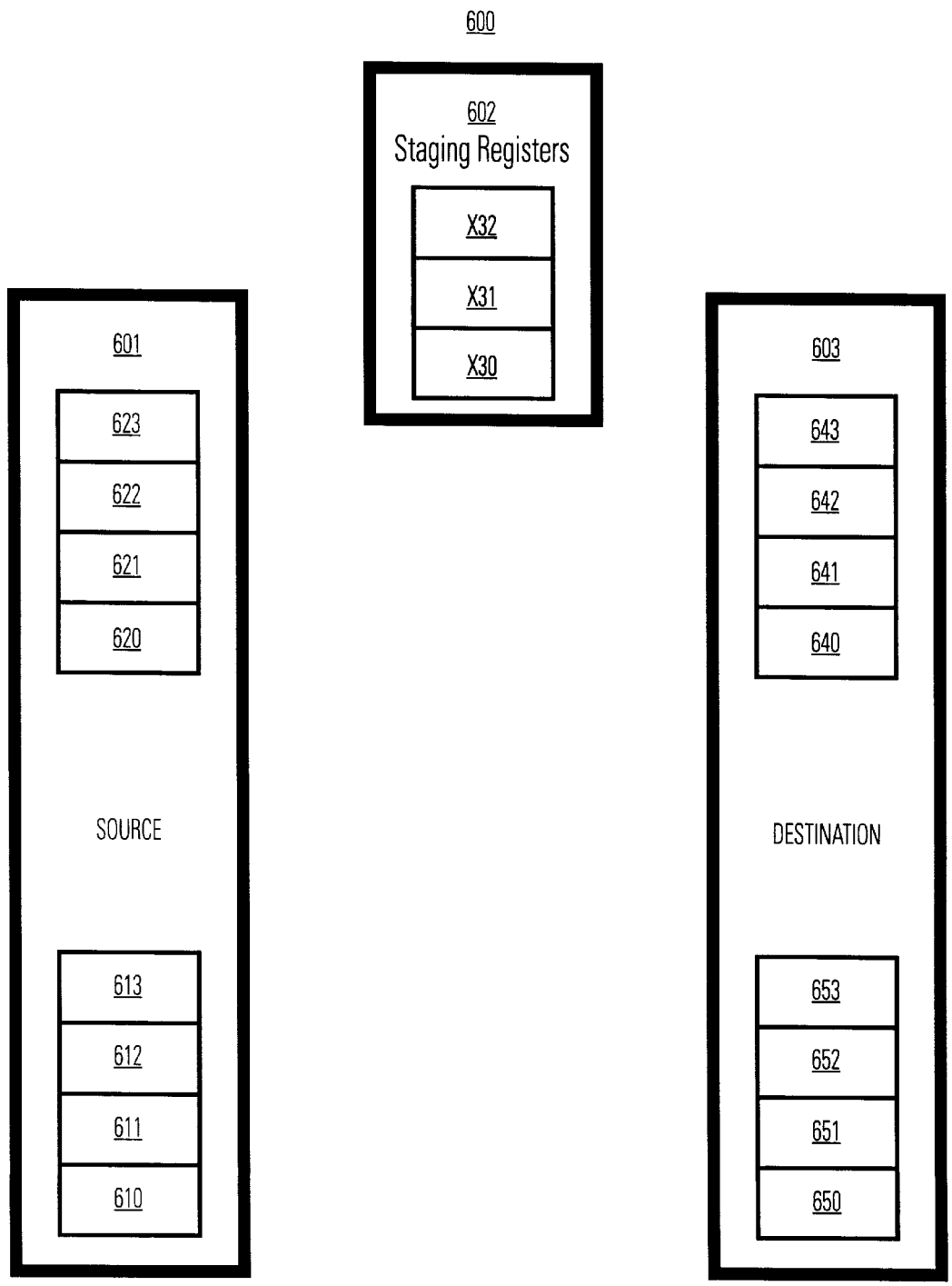
FIG. 6 is a block diagram representing one embodiment of a data assembler of the present invention.

FIG. 6 is a block diagram representing one embodiment of a data assembler 600 of the present invention. In this example, there is an internal PCI 32 bit (4 byte) bus, thus a mismatch in data transfers can be from 1 to 3 bytes. Therefore a staging register is this embodiment is 3 bytes (one less the width of the 4 byte PCI bus). Data assembler 600 comprises source 601, staging register block 602 that temporarily stores information and destination 603. Source 601 comprises slots 610 through 613 and slots 620 through 623, all of which are one byte wide. Staging register block 602 comprises slots 630 through 632 all of which are 1 byte wide. Destination 603 comprises slots 640 through 643 and slots 650 through 653, all of which are one byte wide.

Figure 7:
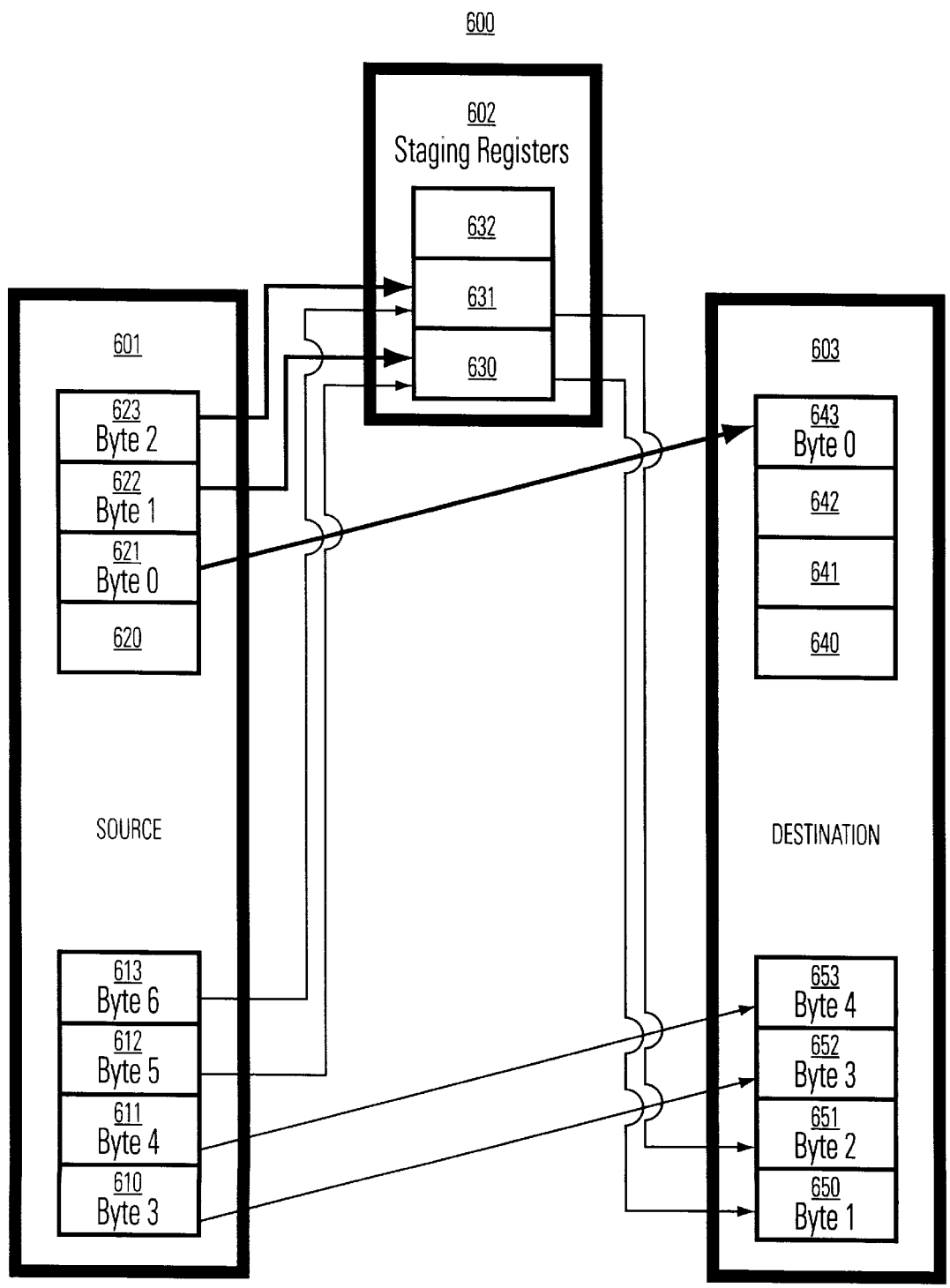

FIG. 7 illustrates an example transfer in which there are more bytes of information in between the natural boundary addresses of $2^n$ and $2^{n+3}$ in source 601 than available corresponding slots in between the natural boundary addresses of $2^m$ and $2^{m+3}$ in destination 603 the information is being transmitted to. In this example the source information starts at address $2^{n+1}$ bytes. During the initial cycle, in this example byte 0 is transferred directly from slot 621 to slot 643 since one byte is the maximum amount of bytes that can be transferred to the one available slot $2^{m+3}$ in between the natural boundary addresses of $2^m$ and $2^{m+3}$ in destination 603. The information in slots 622 and 623 (bytes 1 and 2 respectively) is also transmitted during the first cycle to slots 630 and 631 in staging register block 602. During the next cycle (a second cycle) bytes 1 and 2 are transferred from slots 630 and 631 of the staging registers to slots 650 and 651 of the destination. Byte 3 and 4 in slots 610 and 611 are transferred to slots 652 and slots 653 during the second cycle. Also during the second cycle bytes 5 and 6 are transferred from slots 612 and 613 to 630 and 631. During the next cycle (a third cycle) bytes 5 and 6 are transferred from slots 630 and 631 of the staging registers to the next available slots between natural boundary addresses of $2^{m+8}$ and $2^{m+11}$ of the destination (not shown). Also during this cycle (third cycle) Byte 7 and 8 (not shown) are transferred to the next available slots in the destination and bytes 9 and 10 (not shown) are transferred to 630 and 631. The transfers continue until all the information has been transmitted and there is no information remaining in the staging registers or source.

Figure 8:
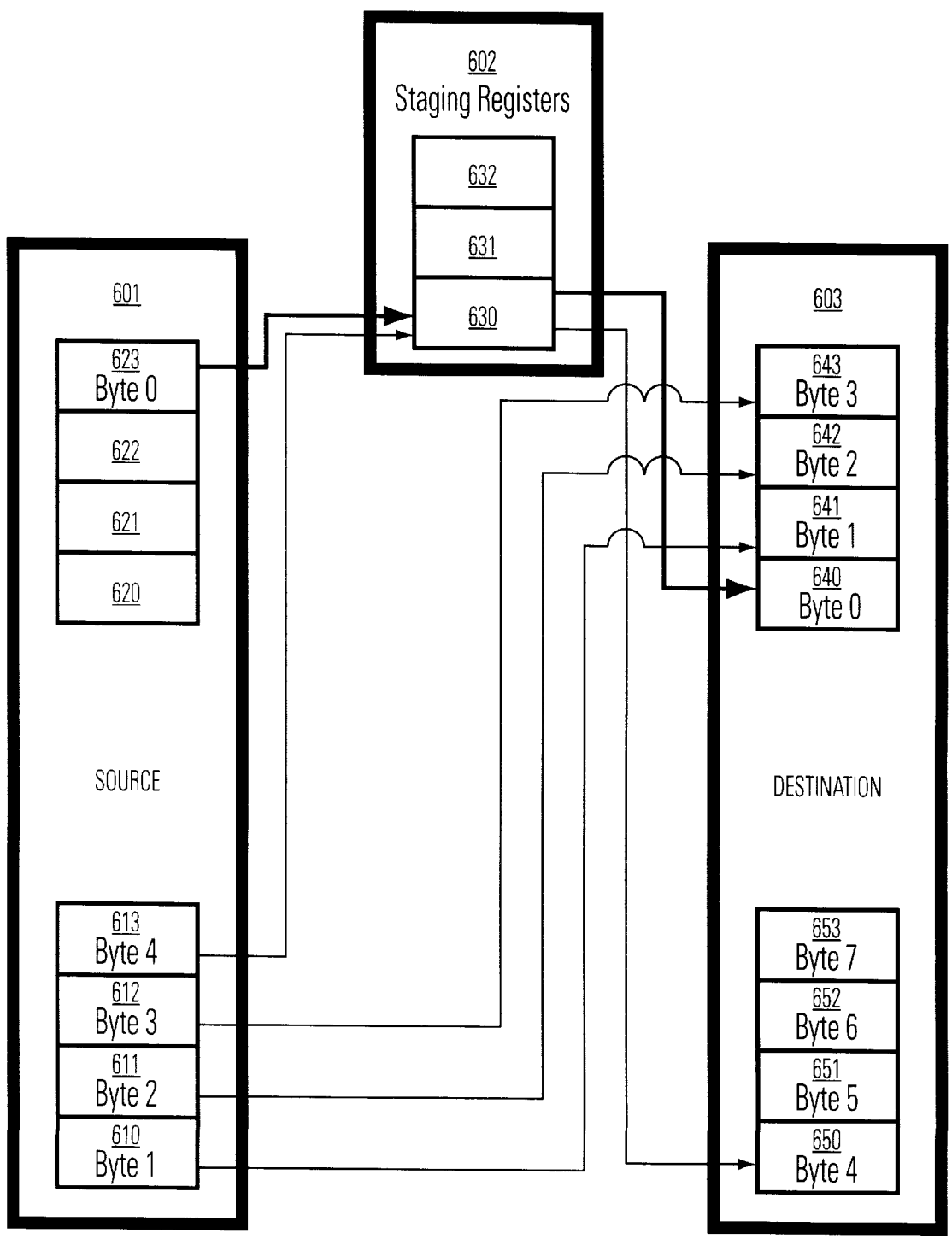

FIG. 8 illustrates a transfer in which there are fewer bytes of information in between the natural boundary addresses of $2^n$ and $2^{n+3}$ in source 601 than available slots in between the natural boundary addresses of $2^m$ and $2^{m+3}$ in destination 603 the information is being transmitted to. In this example the source information starts at address $2^{n+3}$ (four bytes more than the natural boundary of $2^n$, which is a multiple of 4 bytes in this example). During the initial cycle, in this example byte 0 is transferred to slot 630 in the staging register 602 because by itself it would not fill up the available bus width of 4 bytes. In a second cycle byte 0 is transferred from slot 630 to slot 640. Also during the second cycle byte 1, byte 2 and byte 3 from slots 610, 611 and 612 are transferred to slots 641, 642 an 643 respectively and byte 4 is transferred from slot 613 to slot 630. In a third cycle byte 4 is transferred from slot 630 to slot 650 and byte 5, byte 6 and byte 7 are transferred to slots 651, 652 and 653 from the next 32 bit (4 byte) long word if available.

One embodiment of the present invention also ensures that transmission of bursts less than a maximum burst size are configured and transmitted in an optimal manner. For example, in one embodiment of the present invention accesses are limited to a certain types of data or sizes of access and a DMA in one embodiment of the present invention initiates as many transfers of the largest access size in which the entire access capacity is utilized. When the entire capacity of the largest access size can no longer be fully utilized the DMA initiates as many transfers of the next largest access size in which the entire access capacity can be utilized. If the transmissions progress to a situation where there are no smaller access sizes and there is still more information to transmit, the present invention transmits them in the smallest available access size even if its capacity is not fully utilized, continuing in this manner until all the information is transferred. For example if a system is trying to transfer 31 bytes and it only supports 32 byte, 64 bit and 32 bit accesses, the first 3 transfers are 64 bits, the next transfer is a 32 bit and the final 3 transfers are performed with 32 bit accesses with only one byte each.

A GDMA engine system is one embodiment of the present invention that is utilized to move data in a system comprising an SH4 microprocessor subsystem, an SDRAM main memory, and peripheral devices including a DVD storage device, a video device and an audio device. A GDMA engine system provides efficient communication of data between the SDRAM main memory and peripheral components. PRD lists enable the GDMA engine system to keep track of information scattered to various main memory locations and effectively gather the information for communication into continuous concatenated data streams in peripheral components. A data assembler included in a GDMA engine system performs data rotation and data merging to compensate for mismatched byte alignments between a source and a destination, which in this embodiment means they do not start at the same position within a 32 bit (4 byte) double word. The data streams to and from peripheral components are arranged by the GDMA engine system to optimize data transfers according to the constraints of the SH4 microprocessor subsystem which dictates that data is optimally transferred in a 32 byte DDT burst. A GDMA engine system arranges information in complete 32 byte segments for transfer whenever possible. When data starts at a non 32 byte aligned main memory address the GDMA engine system breaks the data transfer up into unaligned-less-than-32-byte pieces at the beginning and the end of a transfer, while ensuring 32 byte aligned pieces of data are transferred in between. A GDMA engine system also ensures that number of main memory accesses required to transfer unaligned-less-than-32-byte pieces (at the beginning or the end of a transfer block) are minimized given the DDT limitations of 32 byte, 64 bit (8 byte), and 32 bit (4 byte) OF SH4 microprocessor compatible DDT requests.

Figure 9:
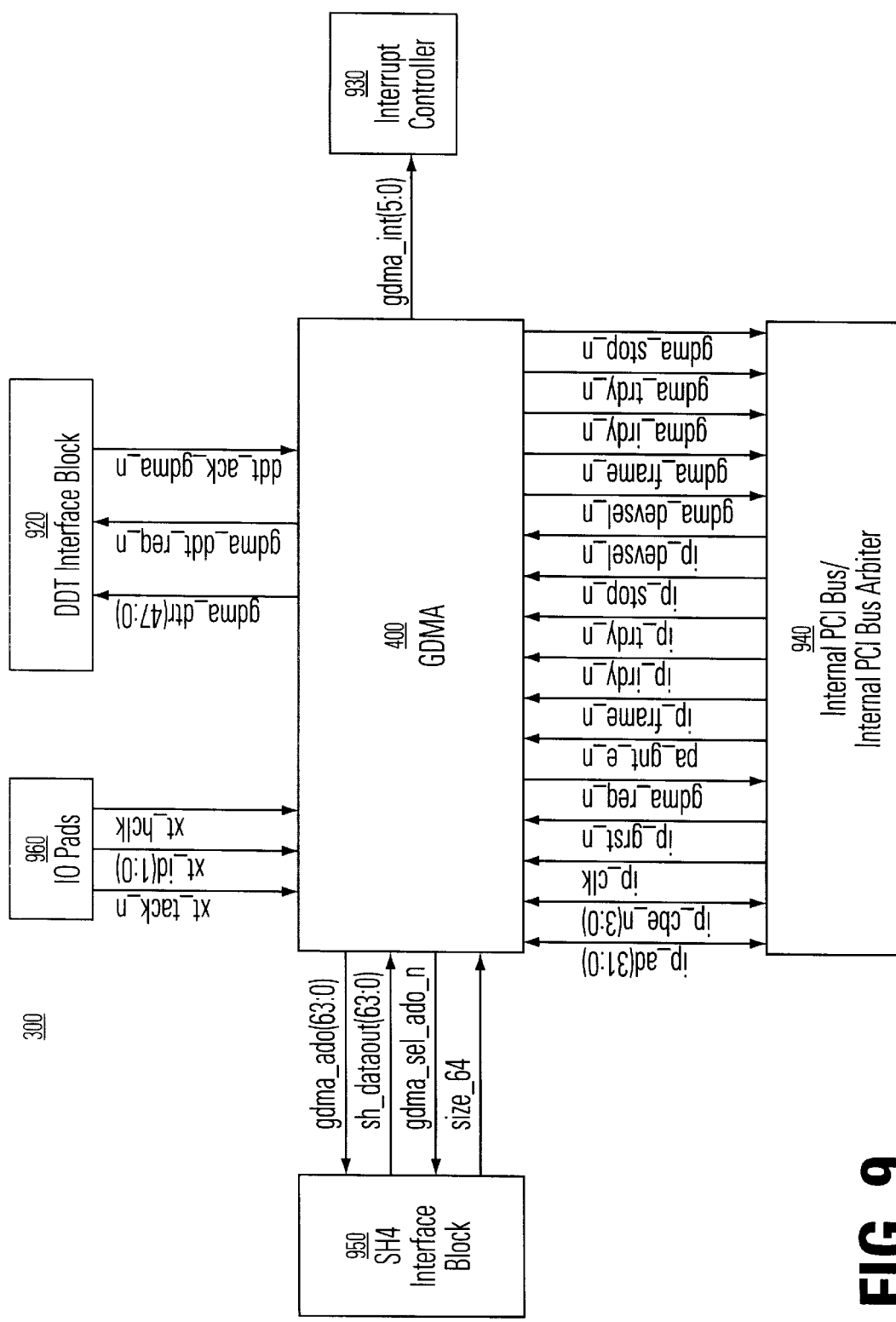
FIG. 9 is a block diagram illustrating an interface system which provides interfacing between a SH4 microprocessor subsystem and a DMA engine system embodiment of the present invention.

FIG. 9 is a block diagram illustrating an interface system 900, which provides interfacing between a SH4 microprocessor subsystem and GDMA engine system 400, one embodiment of the present invention. GDMA interface 900 comprises GDMA engine system 400, DDT interface block 920, interrupt controller 930, internal PCI bus/internal PCI bus arbiter 940, SH4 interface block 950, and I/O pads 960. GDMA engine system 400 is coupled to DDT interface block 920, interrupt controller 930, internal PCI bus/internal PCI bus arbiter 940, SH4 interface block 950, and I/O pads 960.

FIG. 10 is a one embodiment of SH4 interface table 1000 that defines one embodiment of a GDMA engine system interface with SH4 interface block 350. The input/output signals transmitted between the GDMA engine system and SH4 interface block 350 comprise gdma_ado (63:0), sh_dataout (63:0), gdma_sel_ado_n, xt_tdack_n, xt_id, xt_hclk, and size_64. The 64 bit gdma_ado(63:0) output signal includes data transmitted to the SH4 interface block that is sent to the SDRAM and dispersed in during scatter operations throughout the SDRAM. The 64 bit sh_dataout (63:0)input signal includes data transmitted from the SH4 interface input registers that is input into the GDMA's internal buffer. This data includes information for fetching a PRD list and data retrieved from SDRAM during gather operations. The gdma_sel_ado_output signal is an active low signal that notifies the SH4 interface to output to the gdma_ado(onto the AD bus. The xt_tdack_n input signal notifies the GDMA interface to begin receiving data in this SH4_clk clock cycle or to send data during the next cycle. This signal comes straight from pad and is registered internally in order to be in step with the registered AD data. In DDT mode the xt_id (1:0) input signal indicates which DMA channel the current xt_tdack_n input signal is associated with and has a meaning when the xt_tdack_n input signal is active. For example, these bits are used by the GDMA to determine which DDT channel (e.g., CH0 DDT) the current xt_tdack_n input signal is for. Both the xt_tdack_n input signal and xt_id (1:0) input signal data are registered internally. The xt_hclk input signal is a SH4 clock signal and is used by the main GDMA state machine. The size_64 input signal notifies the GDMA whether the external SDRAM data bus is 64-bit or 32 bit is utilized to set up the GDMA data path. For example, in one embodiment a logical 1 indicates is 64-bit bus.

FIG. 11A is a one embodiment of SH4 interface table 1110 that defines one embodiment of a GDMA engine system interface with interrupt controller 930. The input/output signals transmitted between GDMA engine system and interrupt controller 930 includes gdma_int_n (5:0) output signal. The gdma_int_n(5:0) output signal is an active low GDMA channel interrupt transmitted to the interrupt controller. Each channel's interrupt line is set to a logical 0 when it completes a transfer of a block of data whose corresponding PRD has a logical 1 in its end of transfer (EOT) field. Software in the present invention clears the interrupt line by writing to a GDMAINT register in the GDMA.

FIG. 11B is a one embodiment of SH4 interface table 1120 that defines one embodiment of a GDMA engine system interface with DDT interface block 920. The input/output signals transmitted between the GDMA engine system and DDT interface block 920 comprises gdma_dtr (47:0), gdma_ddt_req_n, and ddt_ack_gdma_n. The 48 bit gdma_dtr (47:0)output signal transmits data to DDT interface block 920 and includes gdma_dtr (47:45), gdma_dtr (44), gdma_dtr (43:42), gdma_dtr (41:40), gdma_dtr (39:32) and gdma_dtr (31:0). Signal gdma_dtr (47:45) includes the transfer size SZ(2:0) of the SH4 data transfer request (DTR). Signal gdma_dtr (44) is a read/write signal where a logical 0 signal indicates a read from SDRAM and a logical 1 indicates a write to SDRAM. The gdma_dtr (43:42) is a channel ID (1:0) for the SH4 DTR channel and is hardwired "00" a since the DMA channel 0 of the SH4 is used for gather and scatter operations. The gdma_dtr (41:40) signal is the transfer request mode M.D. of the SH4 DTR and is hard wired to "01". The gdma_dtr (39:32) signal is the transfer count (7:0) of the SH4 data transfer request (DTR). The gdma_dtr (31:0) signal is a 32 bit starting address for the DDT transfer. The gdma_ddt_req_n output signal is in active low DDT servers request to the DDT block. This signal will remain low until the deed GDMA and received or sent to all the data it requested. This signal will be asserted for it least won SH4 clock. The ddt_ack_gdma_n input signal is an acknowledge signal (ACK) from the DDT block for the DDT servers request issued by the GDMA. It did means that the GDMA DDT request has been sentenced to the SH4. The GDMA will then wait for end qualifies it would be channel ID to determine why and to send that the data are war get the data from the SDRAM.

FIG. 12 is a one embodiment of SH4 interface table 1200 that defines one embodiment of a GDMA engine system interface with internal PCI bus/internal PCI bus arbiter 940.

The input/output signals transmitted between the GDMA engine system and internal PCI bus/internal PCI bus arbiter 940 comprise ip_clk, ip_grst_n, dgma_req_n, pa_gnt_e_n, ip_ad(31:0), ip_cbe_n (3:0), ip_frame_n, ip_irdy_n, ip_trdy_n, ip_stop_n, ip_devesel_n, gdma_frame_n, gdma_irdy_n, gdma_trdy_n, gdma_stop_n, and gdma_devesel_n. The ip_clk input signal in an internal PCI clock signal. The ip_grst n input signal in an active low internal PCI bus reset. The assertion of the ip_grst_n input signal is asynchronous and the de-assertion is synchronous to the ip_clk rising edge. The de-assertion is also internally synchronized to the xt_hclk to reset logic running in the SH4 clock zone. A logical 1 dgma_req_n output signal indicates the GDMA is requesting the use of the internal PCI bus. The pa_gnt_e_n input signal is a grant signal from the IPCI arbiter, a logical 0 signal indicating the GDMA is granted access to the internal PCI bus. The ip_ad(31:0)input/output signal is a 32-bit address/data bus for the internal PCI bus. The ip_cbe_n (3:0) input/output signal is a 4 bit PCI command/ byte enable for the internal PCI bus. The ip_frame_n, ip_irdy-n, ip_trdy_n, ip_stop_n and p_devesel_n are standard internal PCI bus signals. The gdma_frame_n output signal is a PCI FRAME_N signal driven by the GDMA and defines the frame for the internal PCI bus when GDMA is granted the bus. The gdma_irdy_n output signal is a PCI IRDY_N returned by the GDMA when it is the target for the current PCI transaction. The gdma_trdy_n output signal is a PCI TRDY_N signal returned by the GDMA when it is the target for the current PCI transaction. The gdma_stop_n output signal is a PCI STOP_N returned by the GDMA when it is the target for the current PCI transaction. The gdma_devesel_n output signal is a PCI DEVSEL_N signal returned by the GDMA when it is the target for the current PCI transaction.

Figure 13:
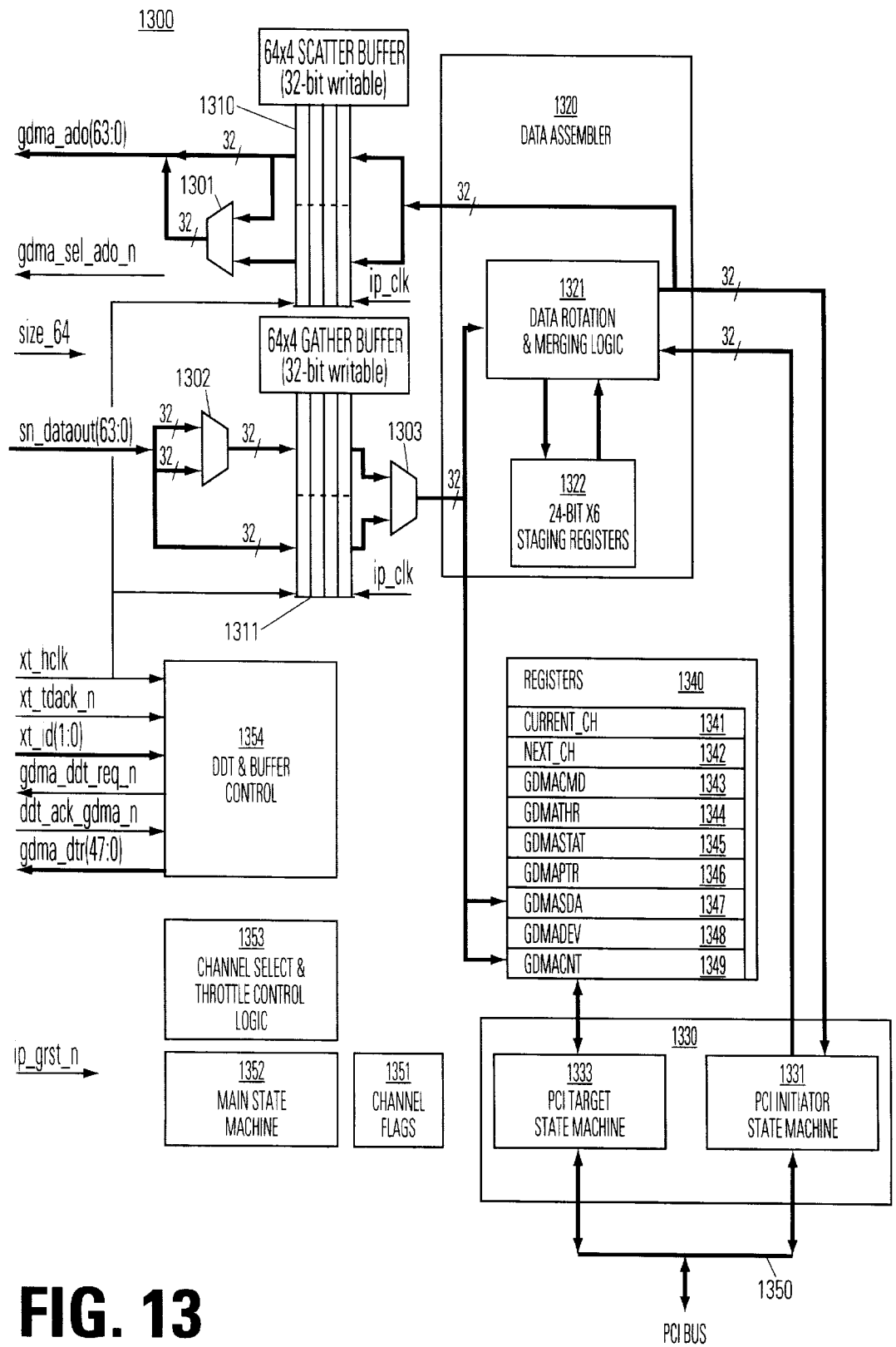
FIG. 13 is a block diagram of one embodiment of a DMA engine system of the present invention.

FIG. 13 is a block diagram of one embodiment of GDMA engine system 1300, one embodiment of the present invention. GDMA engine system 1300 comprises MUX 1301, MUX 1302, MUX 1303, scatter buffers 1310, gather buffer a 1311, data assembler 1320, PCI interface 1330, GDMA control register group 1340, channel flags 1351, main machine state machine 1352, channel select and throttle control logic 1353, DDT and buffer control 1354. The data assembler 1320 comprises data rotation than merging logic 1321 and staging registers 1322. PCI interface 1330 comprises PCI initiator state machine 1331 and PCI target state machine 1333. GDMA control register group 1340 comprises current channel (current_ch) register 1341, next channel (next_ch) register 1342, command (GDMACMD) registers 1343, throttle (GDMATHR) registers 1344, status (GDMASTAT) registers 1345, descriptor table pointer (GDMAPTR) registers 1346, device memory address (GDMASDA) registers 1347, device memory address (GDMADEV) registers 1348, and remaining transfer count (GDMACNT) registers 1349. In the present embodiment of GDMA engine system 1300 there are six each of command (GDMACMD) registers 1343, throttle (GDMATHR) registers 1344, status (GDMASTAT) registers 1345, descriptor table pointer (GDMAPTR) registers 1346, device memory address (GDMASDA) registers 1347, device memory address (GDMADEV) registers 1348, and remaining transfer count (GDMACNT) registers 1349, one for each channel.

The components of GDMA engine system 1300 interact with one another to provide efficient implementation of scatter and gather operations that transfer information between a source and destination, including data that does not line up on a natural memory boundary or has mismatched byte alignments. Data rotation and merging logic 1321 is coupled to scatter buffer 1310, PCI initiator state machine 1331, MUX 1303, register GDMASDA 1347 and register GDMACNT 1349. MUX 1303 is coupled to gather buffer 1311 which is coupled to MUX 1302. MUX 1301 is coupled to scatter buffer 1310. GDMA control register group 1340 is coupled to channel flags 1351, main machine state machine 1352, channel select and throttle control logic 1353, DDT and buffer control 1354.

GDMA engine system 1300 moves data between a system SDRAM (not shown) sitting on an SH4 bus coupled to SH4 interface block 350 and devices sitting on a GPCI, IPCI, and EPCI space through an internal PCI bus/internal bus arbiter 340. The information is transferred in scatter and gather operations by GDMA engine system 1300. Scatter operations refer to moving blocks of data from the GPCI(IPCI, EPCI, etc.) and scattering them into the SDRAM and using PRD lists to keep track of the main memory locations. Gather operations refer to the transfers of data in the opposite direction, that is gathering the scattered data from the SDRAM using the PRD lists and sending the data over a continuous memory space in the GPCI (IPCI, EPCI, etc.). A DDT protocol is utilized by GDMA engine system 1300 for reading and writing information (including PRD information) to and from the main memory SDRAM during scatter and gather operations.

In one embodiment of the present invention, data is gathered or retrieved from the main memory system SDRAM (not shown) using 32 byte DDT transfers with a transfer count of 1 for gather operations, even for pieces of information less than 32 bytes. The extra data retrieved is simply discarded. This not only improves the data access performance but also simplifies the GDMA design. Gather data is then rotated and merged with the data from the 24 bit staging register for the channel to compensate for the mismatch of the byte alignments between the source and the destination addresses. This rotation and merging remain in force for the course of the entire transfer that is specified by the current PRD on the same channel.

When writing data to the SDRAM for a scatter operation, data from the PCI side is pre-formatted (rotated and merged) before it is written into a scatter buffer. It can then be sent out to an SDRAM bus without further processing. As discussed above, a complete 32 byte DDT transfer is used for a scatter operation whenever possible, except when the first piece and the last piece of a block transfer of a PRD list is less than 32 bytes. In the present embodiment. transfers of the first piece and last piece of a block transfer are broken into byte, 32-bit (4 byte), and 64-bit (8 byte) DDT transfers as needed to optimize the transfer. The worst-case occurs when 31 bytes from or to an unaligned 32 byte boundary address. Three DDT requests for a total of seven transfers are required to transfer these 31 bytes. The first transfer request is a one byte size DDT request with the transfer count of 3 for the first three bytes, the next transfer is a 32 bit DDT request with a transfer count of 1 for the 32 bit long word after the first three bytes, and then one 64 bit DDT request with a transfer count of 3 for the last 64-bit quad words.

In the present embodiment GDMA engine system 1300 supports six channels over which information is communicated and each channel can be programmed to be a scatter or gather channel through its command register 1343 independently. The channels are switched in a round robin fashion when a 32 byte or less than 32 byte piece of data for each channel is transferred. After the transfer of a 32-byte chunk of data for a channel is transferred, other channels are checked for a service request. If there are pending requests, GDMA engine system 1300 will switch to the next requesting channel in a rotating priority manner in this embodiment. If there are no requests from other channels pending, service for the current channel will continue until all the data are transferred, or a pending request from another channel emerges, or the throttle timer for the current channel timed out. For the beginning and end chunks of a transfer the switching may occur at less than 32 bytes since these two chunks may comprise less that 32 bytes of relevant information. When the GDMA switches channel at 32 byte boundary, it needs to either restore or setup the rotation and merging for the new channel.

Referring again to FIG. 13, GDMA engine system 1300 supports data transfers to SDRAM widths of 32 bits and 64 bits. MUX 1301 and MUX 1302 are 32 bit 2 to 1 multiplexers that are utilized by GDMA engine system 1300 to support the dual SDRAM width support. SIZE_64 bit from the SH4_IF block notifies GDMA engine system 1300 whether a system SDRAM width is 64 bit or 32 bit and GDMA engine system 1300 uses this information to set up the data paths appropriately. The incoming 2 to 1 multiplexer MUX 1302 is also used to load the starting SDRAM address and byte count information from the PRD of the SDRAM into the internal GDMA control registers GDMASDA and GDMACNT. Select signals for MUX 1301 and MUX 1302 are generated as follows:

mux1301_select_lower<=size_64 or not (scatter_buf_rd_addr(0));1,2 mux1302_select_lower<=not size_64

Active mux1301_select_lower and mux1302_select_lower signals select the lower 32 bit from the data source. Scatter_buf_rd_addr signal is a 3 bit address of the 32 bit data and is utilized to support 32 bit access of a 32 bit SDRAM bus size even though physically the scatter buffer has only two address lines, the DDT & Buffer control block generate 3 bit buffer addresses for 32 bit aligned accesses.

In this embodiment of GDMA engine system 1300 there are separate scatter and gather buffers. Scatter buffer 1310 and gather buffer 1311 are 32 bit writable and organized as 64 bit wide by 4 deep. The 32 bit 2 to 1 multiplexer MUX 1303 converts the 64 bit gather buffer data into a 32 bit unassembled data. Scatter buffer 1310 and gather buffer 1311 are controlled by DDT & buffer control 1354, which is a buffer manager that generates control signals and addresses for the buffers. The select signal for MUX 1303 is:

Mux1303_select_lower<=not gather_buf_rd_addr(0) when load_prd="0" else not prd_ptr_2

The prd_ptr_2 is from gdmaptr(2) when loading a PRD, it toggles after the first 32 bit is loaded. The gather_buf_rd_addr is a 3 bit address for the 32 bit data and is utilized for 32 bit access and conversion of 64 bit buffer data into 32 bit PCI data. Even though physically the gather buffer has two address lines, the PCI master block generates 3 bit buffer for 32 bit aligned accesses.

Scatter buffer 1310 and gather buffer 1311 use a latch data inputs option for write ports due to internal timings. Providing separate scatter and gather buffers simplifies the design and enhances performance. In other embodiments of the present invention a single buffer is shared for both scatter and gather operations and read and write clocks are multiplexed between different clock sources. The separate buffers in GDMA engine system 1300 do not require intricate coordination of multiplexed clock signals.

Figure 14:
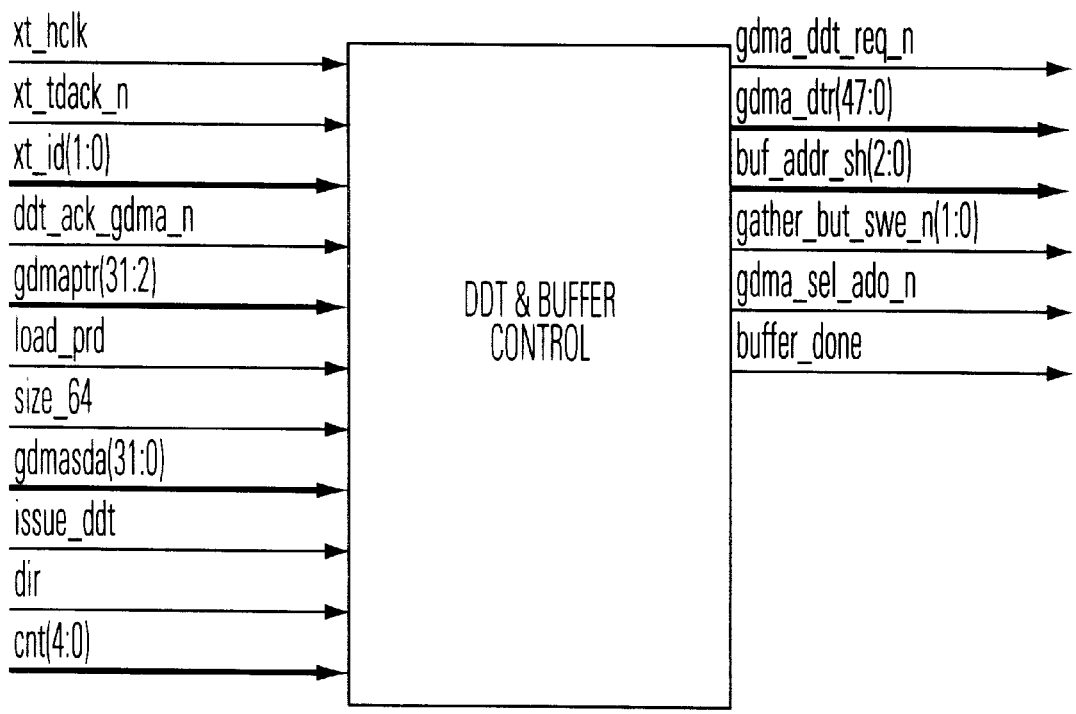
FIG. 14 is a block diagram showing DDT & buffer control interface signals.

DDT & buffer control 1354 handles the interface to the QuickCE interface block and controls data movement between the SDRAM (not shown) and the internal gather buffer and scatter buffer. The same clock that runs SH4 microprocessor (not shown) runs DDT & buffer control 1354. DDT & buffer control 1354 block communicates with the QuickCE DDT block to request DDT service from SH4 for such tasks as loading a PRD list or 32 byte data from the SDRAM, or writing scatter buffer data to the SDRAM. Control and address signals are generated by DDT & buffer control 1354 for the read port of the scatter buffer and for the write port of the gather buffer. It is also responsible for decomposing the scatter buffer data into byte, 32 bit (4 byte) and 64 bit (8 byte) DDT transfers as needed. In this case issue_ddt signal from the main state machine 1352 will toggle once. It is then up to the DDT & Buffer control 1354 to determine how many different sizes of DDTs and what transfer count for each DDT are needed to efficiently write the scatter buffer data into the SDRAM. Once scatter buffer 1310 is completely drained, the DDT & buffer control 1354 informs main state machine 1352 of the completion of the operation by toggling its buffer_done signal. FIG. 14 is a block diagram showing the DDT & buffer control 1354 interface signals.

GDMA control register group 1340 comprises current channel (Current_ch) register 1341, next channel (Next_ch) register 1342, channel command (GDMACMD) register 1343, channel throttle (GDMATHR) register 1344, channel status (GDMASTAT) register 1345, and channel descriptor table pointer (GDMAPTR) register 1346, channel SDRAM address (GDMASDA) register 1347, channel device memory address register (GDMADEV) register 1348 and channel remaining transfer count GDMACNT register 1349. The registers in GDMA control register group 1340 are utilized to store information related to the control and operations of GDMA engine system 1300. Current_ch register 1341 stores an indication of a GDMA channel currently being used for a transfer. Next_ch register 1342 stores an indication of a GDMA channel to be utilized for a future transfer. GDMACMD register 1343 stores auto incrementation information, transfer start information and information setting a transfer direction (e.g., scatter and gather). GDMATHR register 1344 stores information that controls the throttle rate of a DMA transfer for a corresponding channel. GDMASTAT register 1345 stores information on the status of a DMA transfer including information on the beginning and end of the transfer and any errors that may have been detected. GDMAPTR register 1346 comprises an address of a list of in memory of physical region descriptors that describe a SDRAM address during a GDMA operation. GDMADEV register 1347 comprises an address of a destination device. GDMASDA register 1348 comprises a intermediate main memory (e.g., SDRAM) address where it is stored temporarily while it is processed for movement to its final destination. GDMACNT register 1349 comprises a count.

In some embodiments of GDMA control register group 440 there are sets of registers for each communication channel. For example in one embodiment of GDMA control register group 440 there are six registers in each set of registers. FIG. 15A and 15B are tables of example addresses for GDMA control registers in an embodiment in which there are six sets of GDMACMD register 1343, GDMATHR register 1344, GDMASTAT register 1345, GDMAPTR register 1346, GDMASDA register 1347, GDMADEV register 1348 and GDMACNT register 1349.

FIG. 16 is a table illustrating the configuration of bits in one embodiment of GDMACMD register 1343. The "0" bit is called START bit that indicates starts and stops of bus mater operations. Writing a logical 1 to this bit enables bus master operation of the controller and bus master operation begins when this bit is detected changing from a zero to a one. Master operation can be halted by writing a logical 0 to this bit. However, all state information is lost when a logical 0 is written to this bit and master mode operation cannot be stopped and then resumed. The "1" bit is called FIXA and controls fixed/autoincrement device address. Setting FIXA to a logical 1 will cause the device address to be fixed. Setting FIXA to a logical 0 will cause the device address to auto increment. The "2" bit is a reserved bit that returns to a logical 0. The "3" bit is called DIR and is a read or write control. This bit sets of the direction of the bus master transfer and is not changed when the bus master function is active. Setting DIR to a logical 0 will cause data transfers from SDRAM to GPCI. Setting DIR to a logical 1 will cause data transfers from GPCI to SDRAM. The "4" through "7" bits are reserved and return to a logical 0.

FIG. 17 is a table illustrating the configuration of bits in one embodiment of GDMATHR register 1344. Bits "0" through "3" are used to select a throttle level values to pace the rate of a DMA transfer on a channel. A level value of 0 indicates that a GDMA transfer should proceed at the maximum rate with no delays. Level values of 1 through 15 through add increasing delays between transfers that slow down the data communication. Bits "4" through "7" are reserved and return to zero.

FIG. 18 is a table illustrating the configuration of bits in one embodiment of GDMASTAT register 1345. Bit "0" is a read only bit called ACTIVE and is set when the START bit is written to a logical 1 in GDMACMD register 1343. This bit is cleared when the last transfer for a region is performed, where end of transfer (EOT) for that region is set in the region descriptor. It is also cleared when the START bit is cleared in the GDMACMD register 1343. Bit "1" is read/write bit called ERROR and is set when the GDMA PCI master encounters either a PCI target abort or master abort. When ERROR bit (bit "1") is set, the INT bit will be set and the START bit in the GDMACMD register 1343 will be cleared. Bit "2" is a read/write bit called INT and is an interrupt indicator that may also be observed in the global interrupt register. Bit "2" is set when a channel is done, that is when the EOT bit is set in the PRD or the bit called ERROR is set. Bit "2" can be cleared by software writing a logical 0 to this bit. Bits "3" through "7" are reserved and return to a logical 0.

FIG. 19 is a table illustrating the configuration of bits in one embodiment of GDMAPTR register 1346. Bits "0" through "31" comprise a base address of a descriptor table related to a physical region description (PRD) list. Bits "0" through "31" also correspond to possible addresses (A[31:0]) of a main memory, such as SDRAM (not shown in FIG. 13), at which a PRD list begins.

FIG. 20 is a table illustrating the configuration of bits in one embodiment of GDMASDA register 1347. GDMASDA register 1347 stores a memory address of information in the SDRAM (not shown in FIG. 13) and is a read only register. It is initialized by the GDMA state machine 1352 transferring the memory region physical base address from the PRD list to this register. When the DIR bit of GDMACMD register 1343 is a logical 0 the address stored in GDMASADA register 1347 is a memory source address in SDRAM. When the DIR bit of GDMACMD register 1343 is a logical 1 the address stored in GDMASADA register 1347 is a memory destination address in SDRAM. This address always auto increments and this register is updated during transfers to comprise the next address to be transferred. However the address in the PRD list in SDRAM main memory is not updated during the transfer.

FIG. 21 is a table illustrating the configuration of bits in one embodiment of GDMADEV register 1348. GDMADEV register 1348 stores a memory address of a peripheral device (not shown). When the DIR bit in GDMACMD is a logical 0, the address in GDMADEV register 1348 is a memory destination generally in a G-PCI space. When the DIR bit in GDMACMD register 1343 is a logical 1, the address in GDMADEV register 1348 is a memory source generally in a G-PCI space. If the FIXA bit in GMDACMD register 1348 is a logical 0, the address in GDMADEV register 1348 will auto increment and if the FIXA bit is a logical 1 GDMADEV register 1348 will remain constant for the entire transfer.

FIG. 22 is a table illustrating the configuration of bits in one embodiment of GDMACNT register 1349. GDMACNT register 1349 is a read only register and is initialized by the GDMA state machine 1352 transferring the byte count from the list to this register. The count stored in this register decrements and is a updated during GDMA transfers to comprise the remaining byte count. However, the count in the PRD list in SDRAM main memory is not updated during the transfer.

Figure 23:
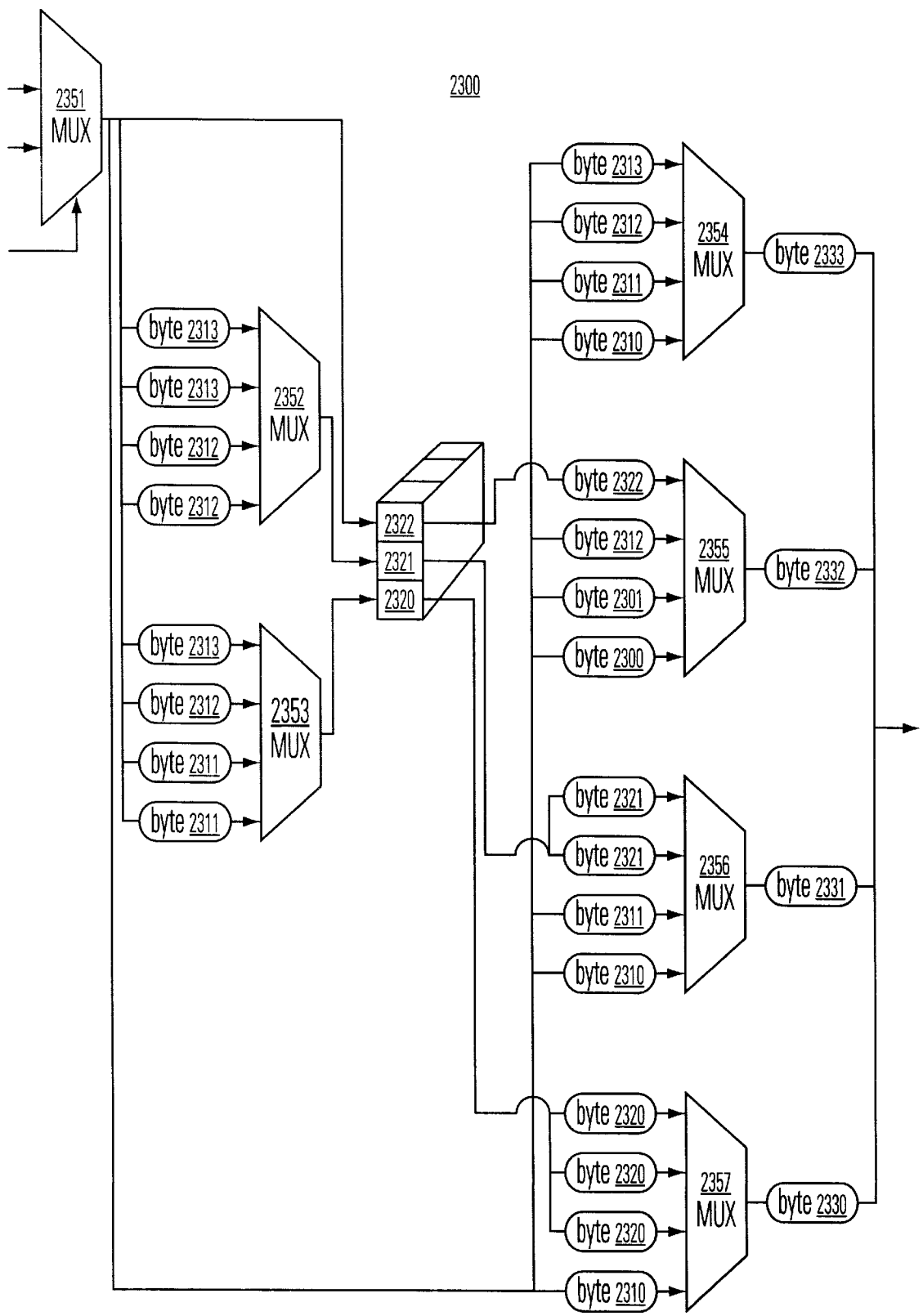
FIG. 23 is a block diagram of one embodiment of data assembler used to rotate and merge data transferred through one channel of a DMA engine system.

FIG. 23 is a block diagram of one embodiment of data assembler 1320 used rotate and merge data transferred through one channel of GDMA engine system 1300. This embodiment of data assembler 1320 data and rotation & merging logic 1321 comprises MUX 2354, 2355, 2356, 2357, 2358, 2359, and 2360 and staging registers 1322 comprises registers 2320, 2311 and 2322. Even though FIG. 23 shows one 24 bit register divided into three registers (i.e., registers 2320, 2311 and 2322) that are one byte (8 bits) wide, staging registers 1322 actually includes six 24 bit registers one foe each channel. FIG. 24 is a table of the logic used to determine a select signal for MUX 2354, 2355, 2356, 2357, 2358, 2359, and 2360. In this embodiment the select signal is generated based upon the lower two bits of a source and destination addresses. A higher order byte of a source is not transferred to a lower order byte of a destination directly, it goes through the staging registers 1322, which in this example includes registers 2320, 2311 and 2322. The * in the MUX select table indicates situations when the first cycle of a transfer is merely storing the source data into staging registers 1322 and data is not transferred to the destination until the second cycle. This information is used by the control logic to determine whether an extra store cycle is needed at the beginning of a transfer. The select signal for the multiplexers has to be latched once it is generated. It will remain in force for the entire transfer for a PRD of the same channel and has to be regenerated when a new PRD is loaded. The following equations generate the 2 bit select signal and the extra store cycle indicator:

src_addr(1:0),=GDMASDA(1:0) when DIR="0" else GDMADEV (1:0);

dst_addr(1:0)<=GDMADEV when DIR="0" else GDMASDA (1:0);

mux5_10_sel(1:0),+src_addr(1:0)–dst_addr (1:0);

extra_cycle<="1" when src_addr(1:0;). dst_addr (1:0) else "0".

In this embodiment MUX 5_10_sel is latched in the first transfer of a PRD and remains in force for the rest of the transfer for the same PRD.

In one embodiment of GDMA engine system 1300 PRD information is transferred from a main memory to GDMA engine system 1300 in 32 bit (4 byte) DDT data sizes with a transfer count of 2. It is possible that GDMA engine system 1300 will require 4 more SH4 clock cycles than other embodiments of the present invention using a 32 byte DDT with a transfer count of 1 in some instances. However, since the SDRAM main memory is not always a 64 bit memory and the address of the PRD is 32 bit (4 byte) aligned, using a 32 byte DDT does not always save four SH4 clock cycles and it complicates the design. In the present embodiment the simplified design of GDMA engine system 1300 in which PRD information is transferred from main memory to GDMA engine system 1300 in 32 bit (4 byte) DDT data sizes and a transfer count of 2 outweighs the few instances in which the transfer requires four additional SH4 clock cycles. In other embodiments of the present invention transfers of PRD information between other GDMA engine systems and a main memory are accomplished with different transfer configurations (e.g., a 32 byte DDT with a transfer count of 1).

GDMA engine system 1300 is capable of utilizing the sample PRD information provided in FIG. 3A and 3B to transfer information in scatter and gather operations. A PRD setup begins by writing the memory mapped registers in GDMA engine system 1300. This sets the address of the PRD list in memory that will describe the SDRAM address during this DMA operation. As discussed above, the PRD list is a list of addresses and counts that allows the data from various locations and misalinged starting addresses to be gathered into a single stream of data to another device, in this example an audio device. The beginning device address is set to the memory mapped audio device in this case. In this embodiment the address of the audio device will increment. In another embodiment the transfer is set to non increment and the "gathered" data is sent to a single address. The SDRAM address in the GDMASDA2 register and the count in the GDMACNT2 register are not initiated by software, they are read only registers and these values are obtained from the list of PRDs that are created by software and that describe the DMA transfer. The PRD list is created when software processes the headers at the start of each sector.

Figure 25:
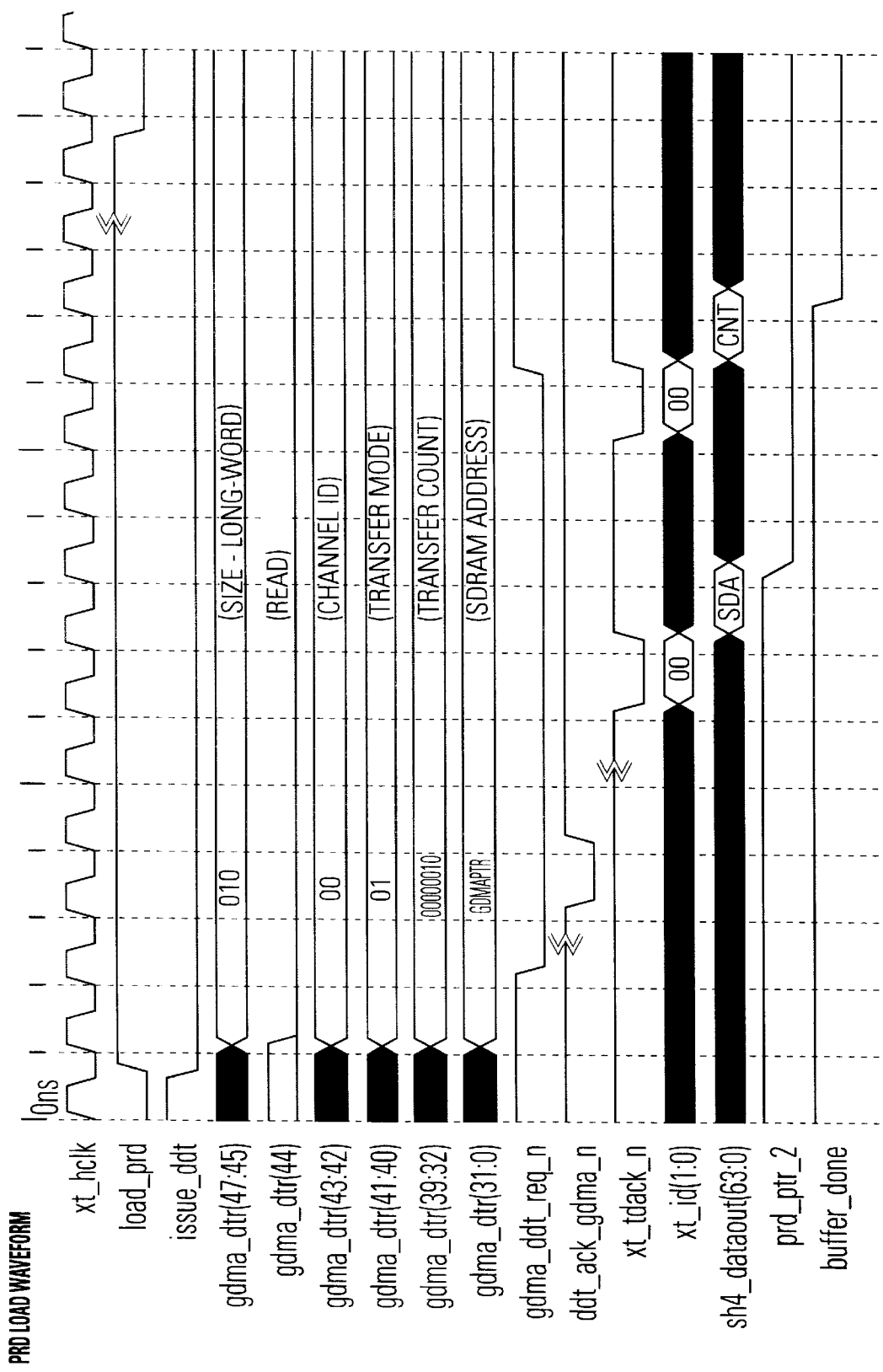
FIG. 25 illustrates one example of the waveform signals included in DDT & buffer control operations for loading the PRD from SDRAM.

FIG. 25 illustrates one example of the waveform signals included in DDT & buffer control 1354 operations for loading the PRD from SDRAM. In the present embodiment a 32 bit DDT with a transfer count of 2 is used to load a PRD from the SDRAM into DMA internal registers. The 32-bit data size is used because the PRDs are guaranteed to be aligned on a 32-bit boundary. The issue_ddt and the buffer_done are toggle type interface signals that function as handshake signals between DDT & buffer control block 1354 and main state machine 1352. A transition from either high to low or low to high indicates a new event and they cross SH4 clock and I PCI clock zones. A transition detector is used at the destination to synchronize and detect transition on each signal.

Figure 26:
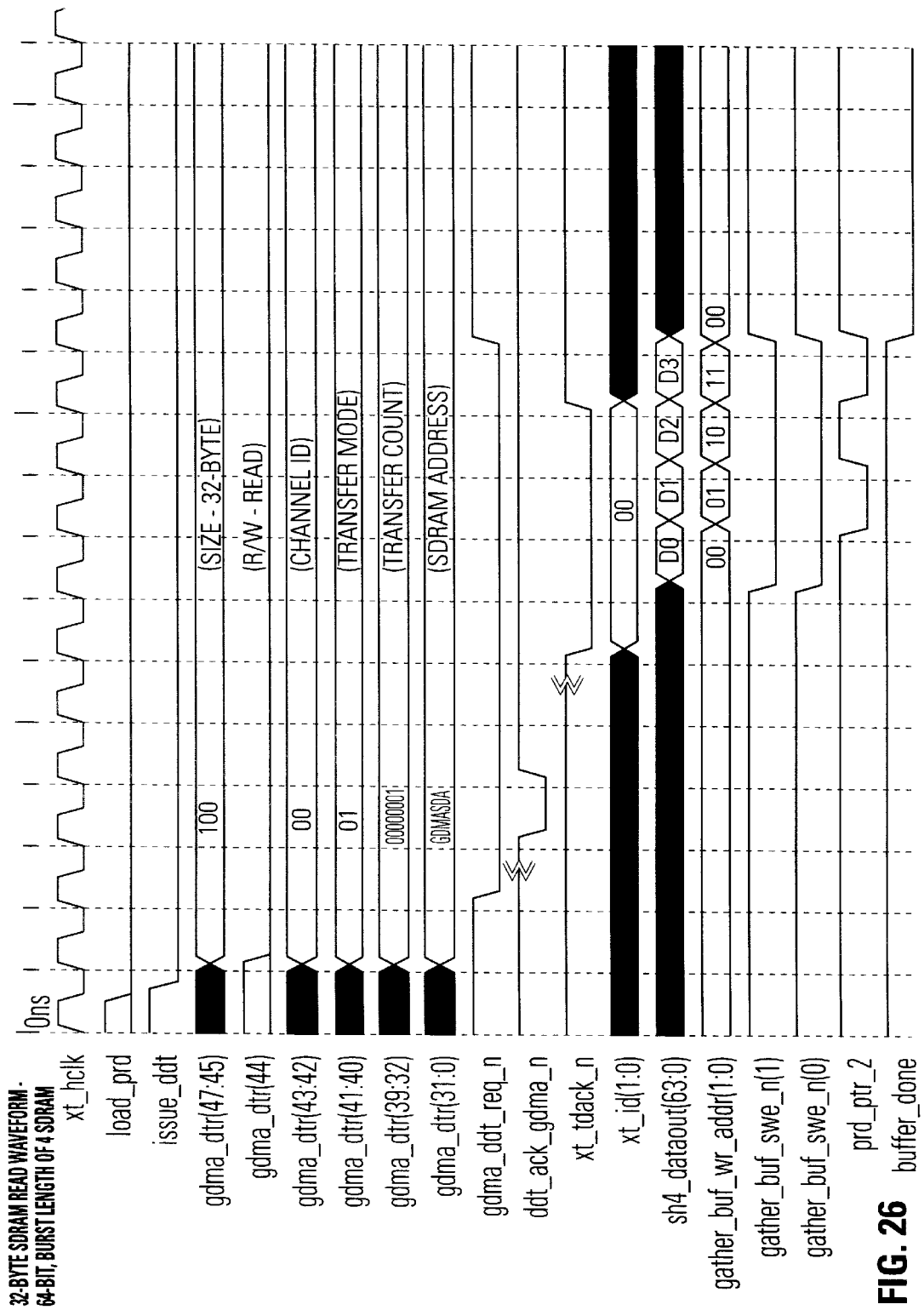
FIG. 26 illustrates examples of one embodiment of the waveform signals included in the DDT & buffer control operations for loading SDRAM data into a gather buffer.
Figure 27:
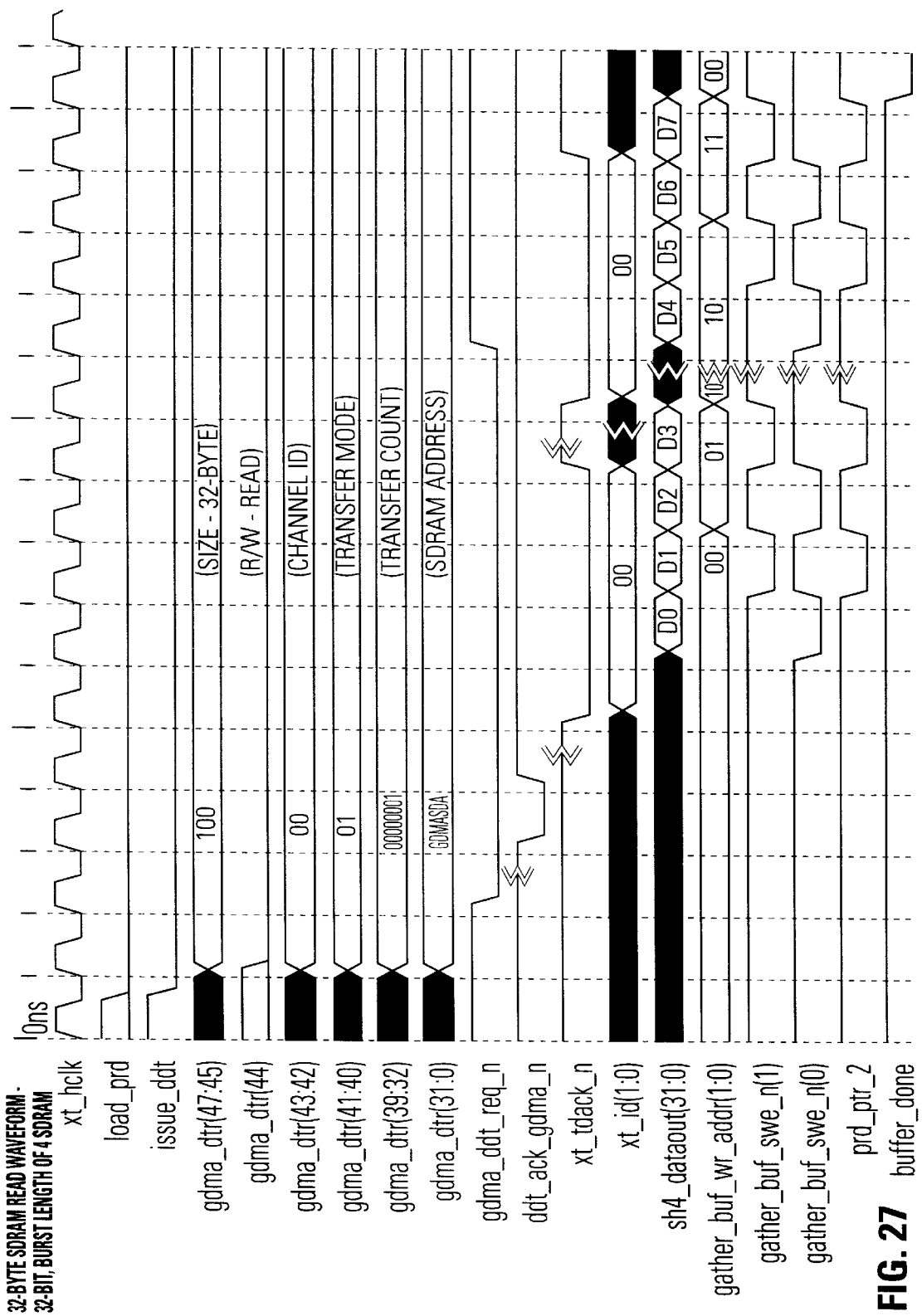
FIG. 27 shows another example of waveform signals included in the DDT & buffer control operations for loading SDRAM data into a gather buffer for a 32-bit burst length of 4 byte SDRAM bus.

FIG. 26 illustrates examples of one embodiment of the waveform signals included in the DDT & buffer control 1354 operations for loading SDRAM data into gather buffer 1311. A 32 byte DDT with a transfer count of 1 is used to load 32 bytes of data from the SDRAM into the GDMA gather buffer 1311. When less than 32 bytes of data are required, as are in most cases for the first and/or the last transfers of a PRD list, the extra data are stored in the gather buffer 1311 but are not used. FIG. 26 shows the waveform for this operation for a 64-bit wide, burst length of 4 SDRAM bus. FIG. 27 shows the waveform for the same operation for a 32-bit wide, burst length of 4 SDRAM bus. In these cases, the prd_ptr_2 is irrelevant but it toggles anyway. Its initial value depends on the GDMASDA(2) 1347.

As discussed above multiple DDT requests are used to write the data from GDMA scatter buffer 1310 into the SDRAM when the buffer is partially full, for example the first and/or the last transfers of a PRD list. In the present embodiment data transfer to the SDRAM will be broken into byte, 32-bit, and 64-bit DDT requests as necessary in order to improve performance. The other scatter buffer transfers for the same PRD list are 32 bytes in size and use 32 byte DDT requests with a transfer count of 1. This is same as the one used for loading the gather buffer, except the read/write bit in the DTR need contains a "1" instead of the "0".

Figure 28:
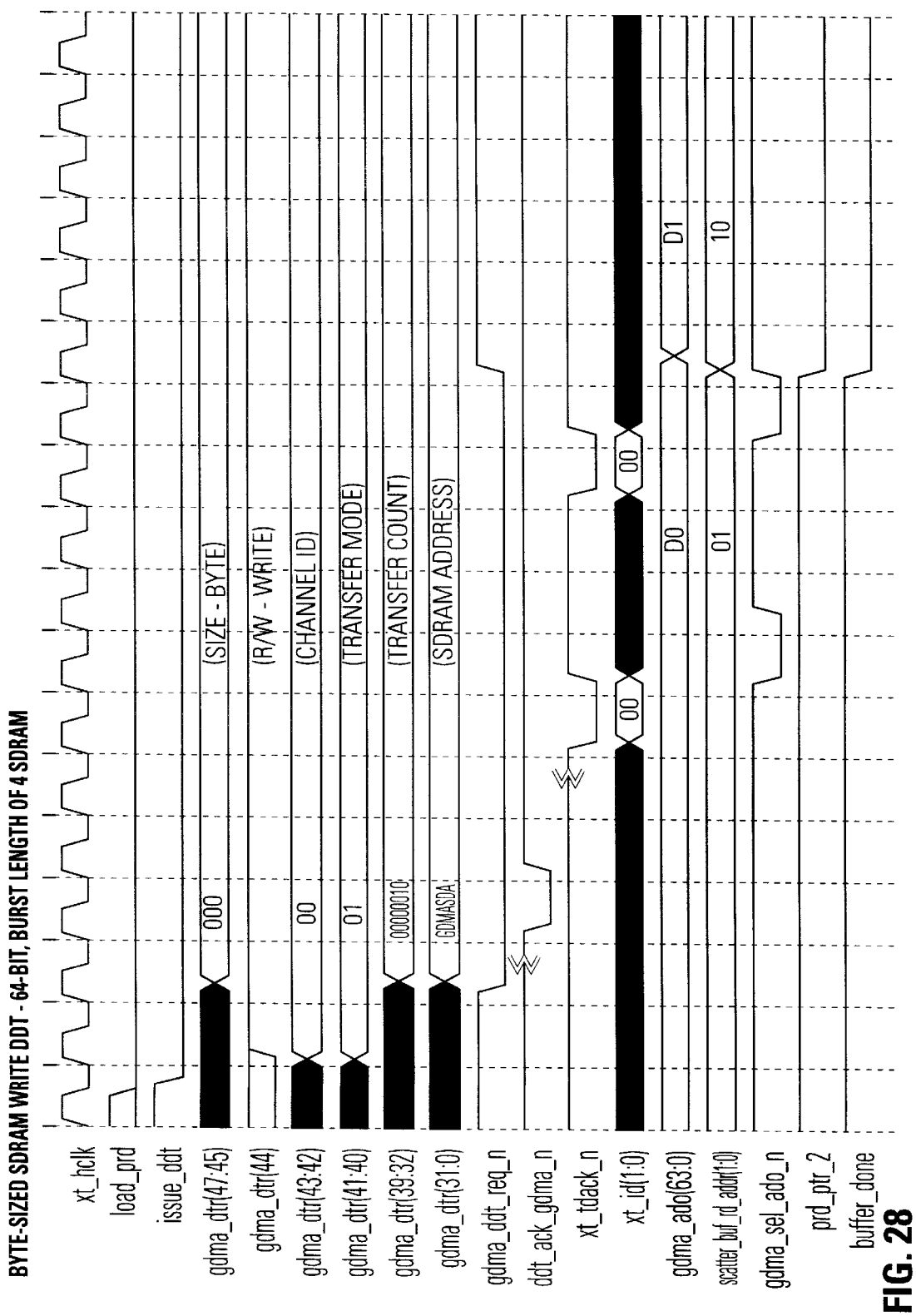
FIG. 28 illustrates one embodiment of waveform signals included in the DDT & buffer control operations for loading data from the scatter buffer.

FIG. 28 illustrates one embodiment of waveform signals included in the DDT & buffer control 1354 operations for loading data from the scatter buffer. FIG. 28 shows the waveform for a byte sized SDRAM write DDT in a 64-bit burst length of 4 SDRAM system. This diagram shows a byte size DDT transfer with the transfer count of 2. The 2 bytes are bytes 6 (the seventh byte) and byte 7 (the eighth byte) of the second 64-bit data in the scatter buffer. The scatter_buf_addr and the gdma_ado(63:0) signals remain the same for the 2 bytes since they are the same 64-bit location in the scatter buffer. The scatter_buf_addr signal increments after the 2 bytes are transferred to prepare for the next 64-bit data transfer. The prd_ptr_2 signal toggles after the second byte is transferred but because it's a 64-bit bus, the prd_ptr_2 signal has no effect on MUX 401 that sets up the gdma_ado (63:0) signal path.

Figure 29:
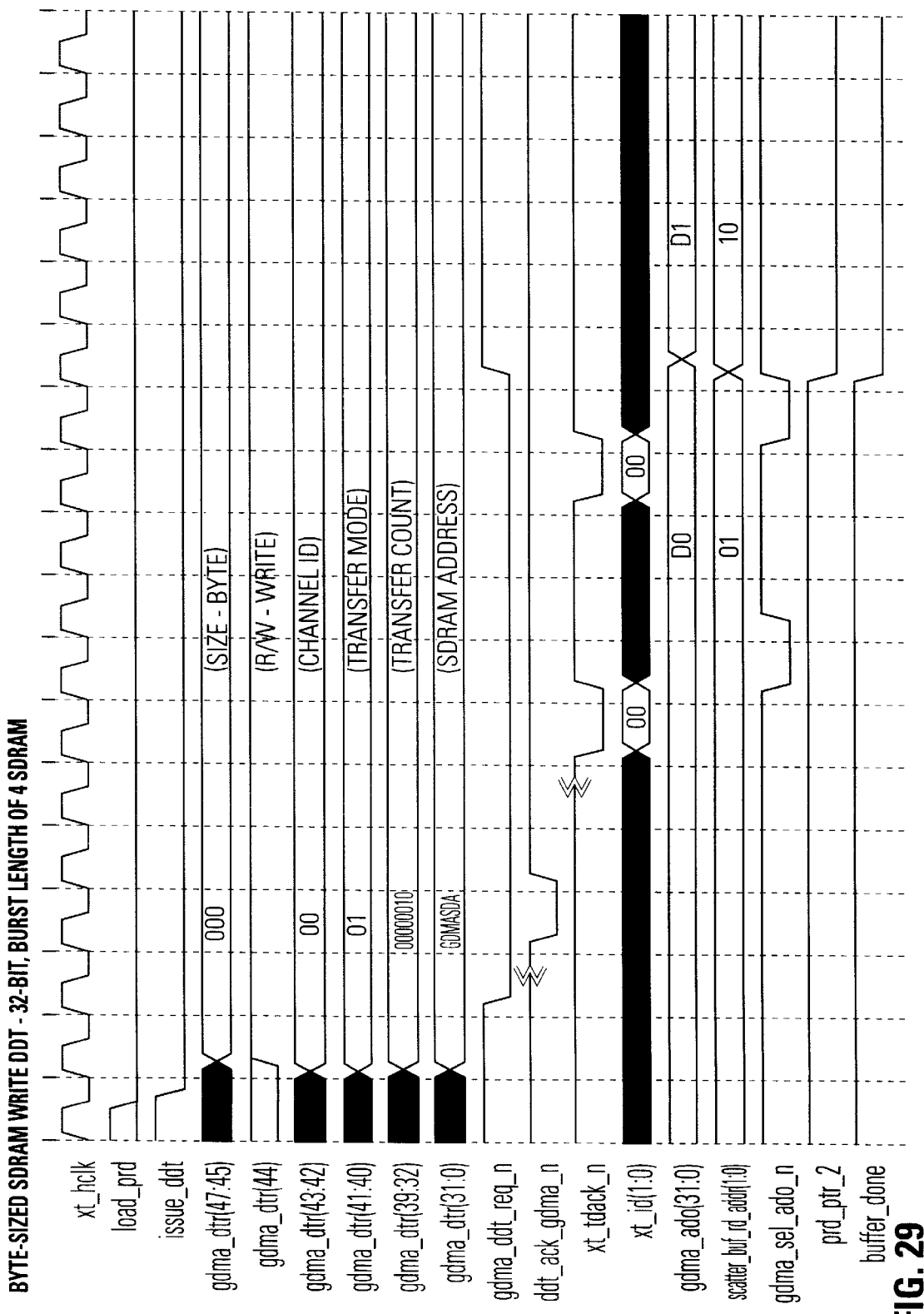
FIG. 29 is another example of waveform signals included in the DDT & buffer control operations for loading data from the scatter buffer.

FIG. 29 illustrates one embodiment of waveform signals included in the DDT & buffer control 1354 operations for loading data from the scatter buffer. Figure D shows the waveform for the same byte sized DDT in a 32-bit SDRAM system. It is identical to figure D except that only gdma_ado (31:0) signal is used for data transfer and the prd_ptr_2 signal now affects the select of the MUX 1301 that determines which 32-bit half of the 64 bit scatter data goes to the external 32-bit SDRAM bus.

Figure 30:
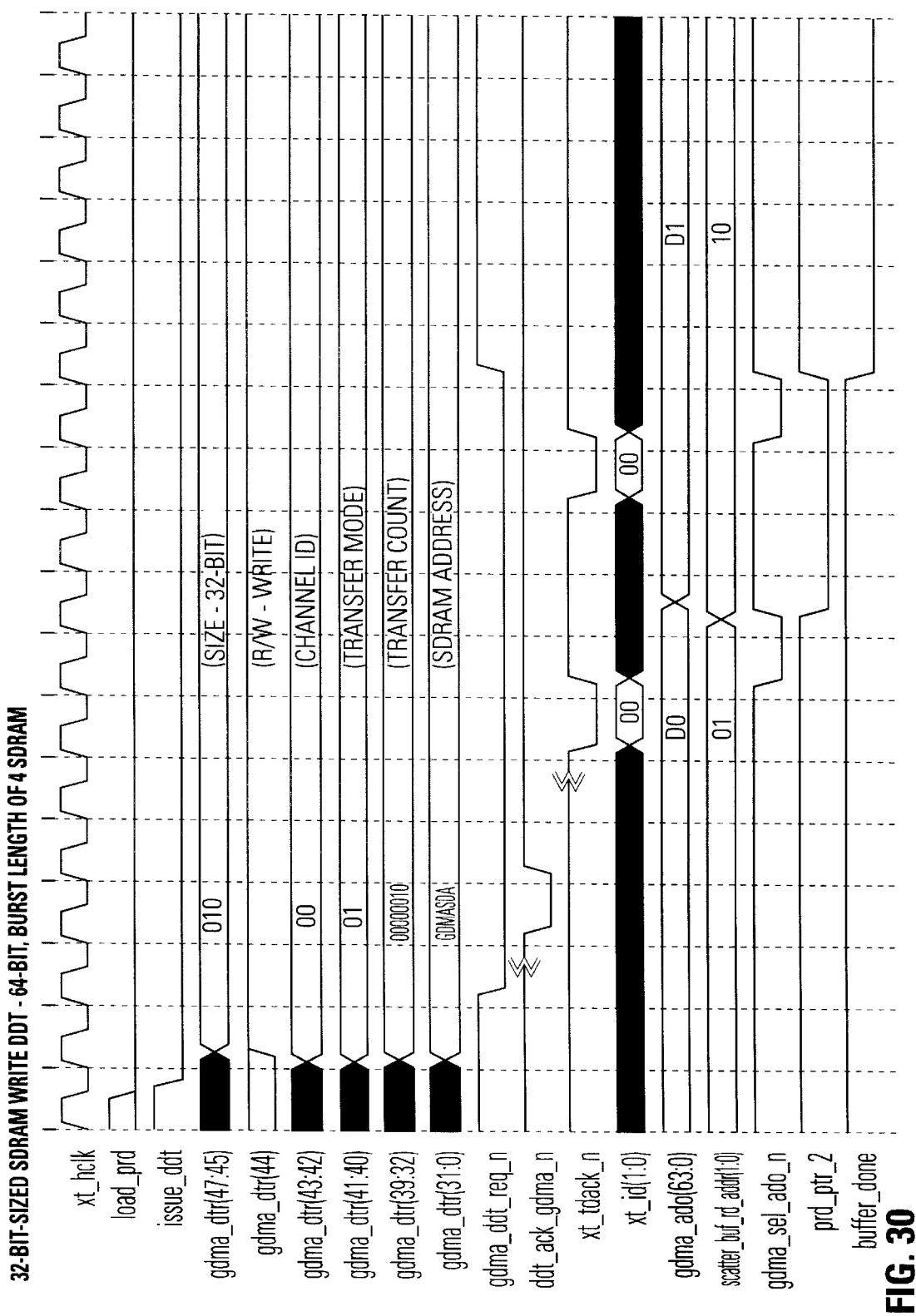
FIG. 30 illustrates one embodiment of waveform signals included in the DDT & buffer control operations for loading data from the scatter buffer.

FIG. 30 illustrates one embodiment of waveform signals included in the DDT & buffer control 1354 operations for loading data from the scatter buffer. Figure F shows a waveform for a 32-bit size to SDRAM write DDT in a 64-bit SDRAM system. It begins with the upper 32-bit (GDMASDA(2) is a "1") of the second entry (scatter_buf_addr="01") of the scatter buffer. The scatter_buf_addr increments after the first 32-bit since the next 32-bit will come from the lower half of the next scatter buffer entry. The prd_ptr_2 also toggles after the first 32-bit but has no effect in this case. The waveform for the same 32-bit sized transfer in a 32-bit SDRAM system is same as the one in figue F except that only gdma_ado (31:0) signal is used to transfer data. The prd_ptr_2 signal will now direct the appropriate half of the 64-bit data from the scatter buffer to the external 32-bit SDRAM bus.

Figure 31:
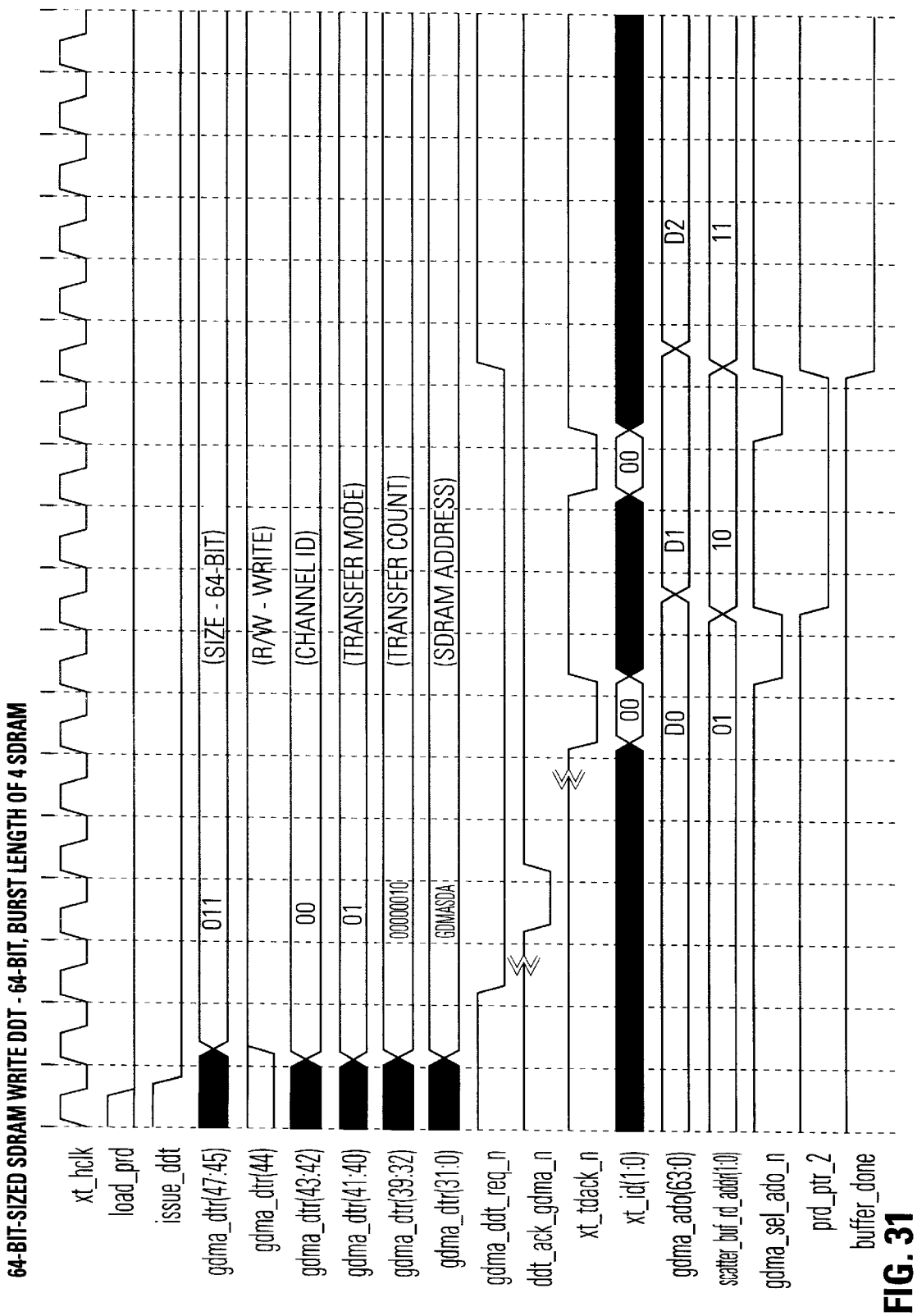
FIG. 31 is another embodiment of waveform signals included in the DDT & buffer control operations for loading data from the scatter buffer.

FIG. 31 illustrate one embodiment of waveform signals included in the DDT & buffer control 1354 operations for loading data from the scatter buffer. FIG. 31 shows a waveform for 64-bit sized SDRAM write in the 64-bit SDRAM system. The scatter_buf_addr increments after a 64-bit transfer to point to the next 64-bit in the scatter buffer. The prd_ptr_2 toggles after a 64-bit transfer as well but has no effect in this case.

Figure 32:
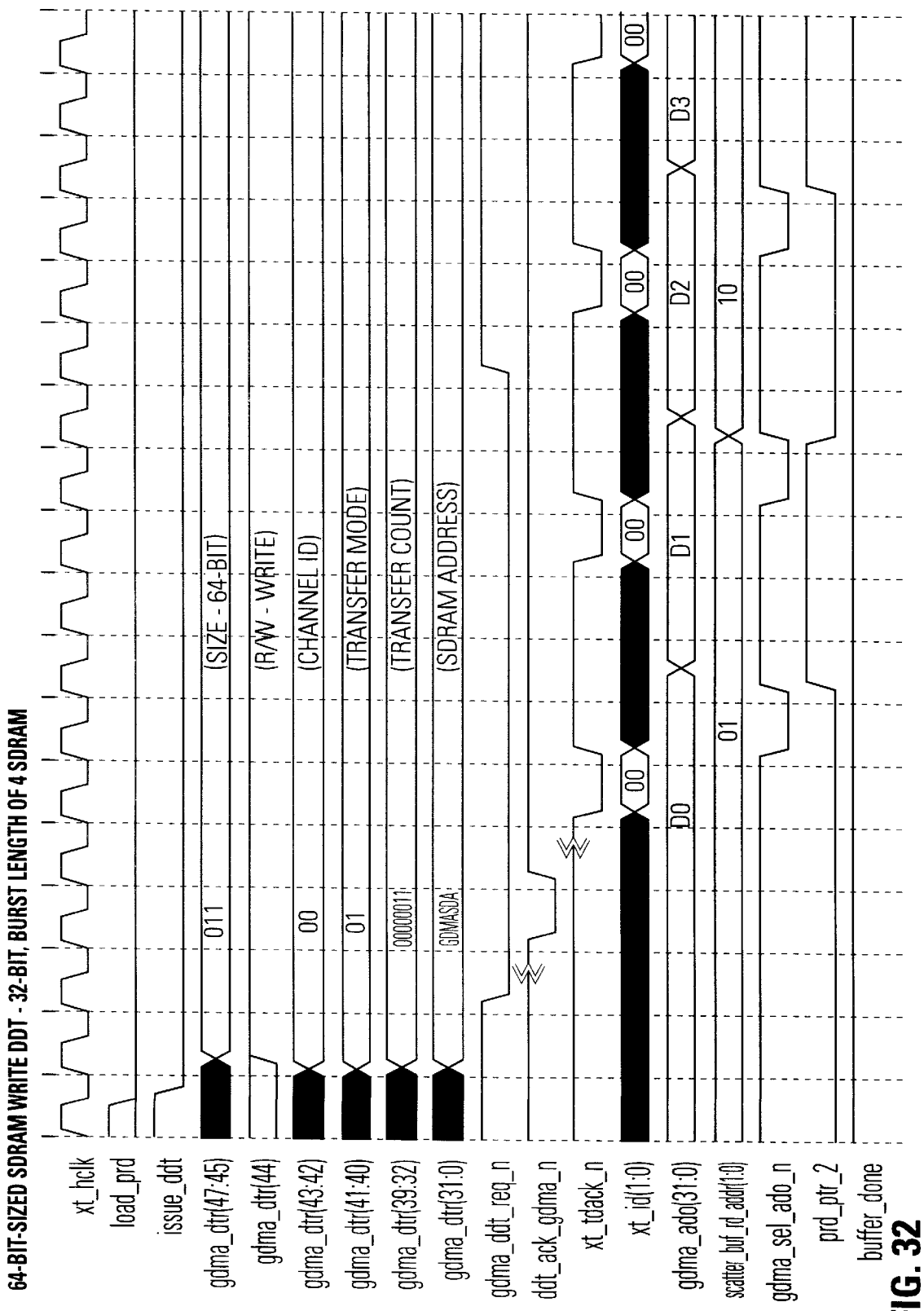
FIG. 32 illustrates one embodiment of waveform signals included in the DDT & buffer control operations for loading data from a scatter buffer.

FIG. 32 illustrate one embodiment of waveform signals included in the DDT & buffer control 1354 operations for loading data from the scatter buffer. Figure H shows a waveform for 64-bit sized SDRAM right in a 32-bit SDRAM system. In this case only the gdma_ado (31:0) is used for data transfer. These scatter_buf_addr increments after a 32-bit transfers to point to the next 64-bits in the scatter buffer while the prd_ptr_2 toggles after a 32-bit transfer to point to the correct half of the 64-bit data from the scatter buffer. FIG. 32 only shows the first three 32-bit data transfers of a 64-bit size DDT with a transfer count of 3. The figure does not show buffer_done toggling because there are three more 32-bit data transfers before this DDT is done.

Figure 33:
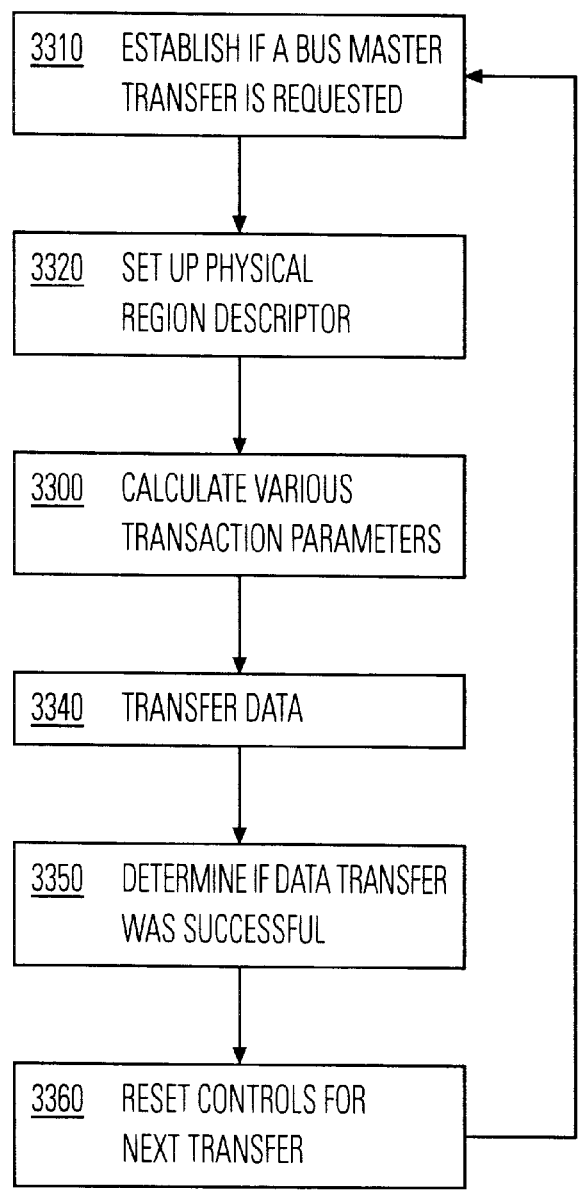
FIG. 33 is a flow chart illustrating the operation of a DMA method embodiment of the present invention.

FIG. 33 is a flow chart illustrating the operation of GDMA method 3300, one embodiment of the present invention. GDMA method 3300 processes information in a manner that maximizes DMA transfers of arbitrarily aligned data. PRD lists in conjunction with merging and rotation logic is utilized to facilitate smooth streaming of data. Impacts due to access constraints of a media format or operating system memory allocation method are minimized while efficiently communicating data that is not a length directly supported by hardware GDMA method 3300 is implemented on. The maximum capacity of intermediate communication bursts between a first and last communication burst are fully utilized and the number of adverse memory accesses are minimized in the first and last communication bursts of a transfer.

GDMA method 3300 comprises 5 steps. In step 3310 the process begins by establishing if a bus master transfer is requested. In step 3320 of GDMA method 3400, PRD parameters are set up. Referring again to FIG. 33, in step 3330 various GDMA method 3300 transaction parameters are calculated. In FIG. 33 illustrating one embodiment of GDMA 3300 data is transferred in step 3340.

Figure 34:
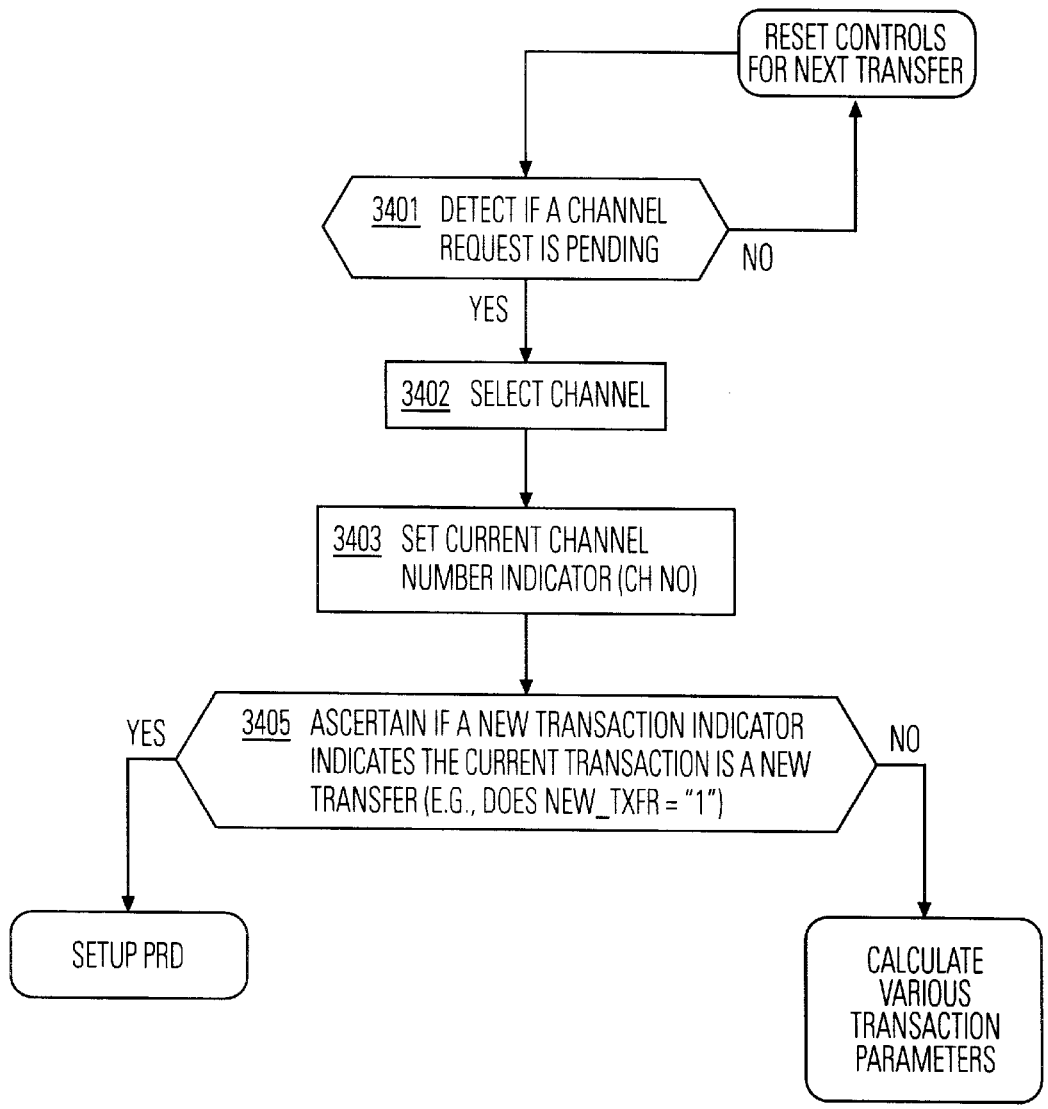
FIG. 34 illustrates one embodiment of steps in which it is established if a bus master transfer is requested.

FIG. 34 illustrates one embodiment of step 3310 in which it is established if a bus master transfer is requested. In step 3401 GDMA method 3300 detects if a channel request is pending. If no channel request is detected the method loops back to check if any channel requests are pending. If a channel request is pending the process proceeds to step 3402 in which a channel is selected based upon throttle and channel select algorithms and a set of registers associated with the selected channel are brought to life. After a channel has been selected a corresponding current channel number indicator (CH NO) is set in step 3403. Then GDMA method 3300 ascertains if a new transaction indicator indicates the current transaction is a transfer to be performed for a new PRD. For example, does new transaction indicator NEW_TXFR equal a logical "1". If it does it means the current transaction is a new transfer for a new PRD and the process proceeds to step 3320 to set up the new PRD. If NEW_TXFR indicator variable is not equal to a logical "1" it means that the current transaction is a continuing part of the last PRD and the process proceeds to step 340 and calculates various transaction parameters.

Figure 35:
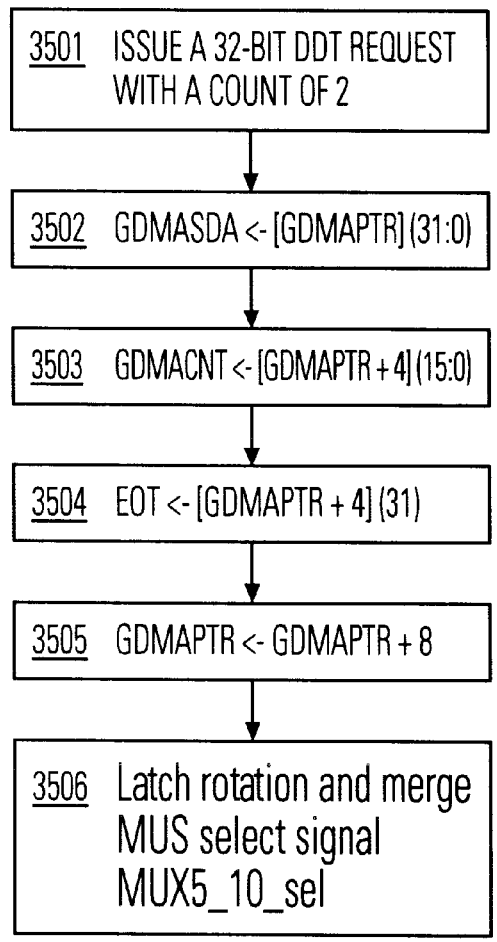
FIG. 35 illustrates one embodiment of setting up PRD parameters in a DMA method of the present invention.

FIG. 35 illustrates one embodiment of setting up PRD parameters in step 3320 of GDMA method 3300. In step 3501 a request to retrieve PRD information is issued (e.g., 32 bit DDT request with a transfer count of 2). A memory address register (e.g., GDMASDA) is set to a descriptor table pointer register (e.g., GDMAPTR (31:0)) in step 3502. Then a register that stores a count of bytes remaining to be transferred from a particular PRD (e.g., GDMACNT) is set in step 3503 to an address in a present descriptor table pointer register plus the number of bytes in each transfer of PRD information (e.g., GDMAPTR (15:0)+4). In step 3504 an end of transfer indicator (EOT) is set to a present descriptor table pointer register plus the number of bytes in each transfer of PRD information (e.g., GDMAPTR+4). Then in step 3505 an address in a present descriptor table pointer register is increased by the number of bytes describing the PRD (e.g., GDMAPTR plus 8). In step 3506 a multiplexer select signal (e.g., MUX5_10_sel) is set for the multiplexers utilized in data rotation and merging in one embodiment of the present invention.

Figure 36:
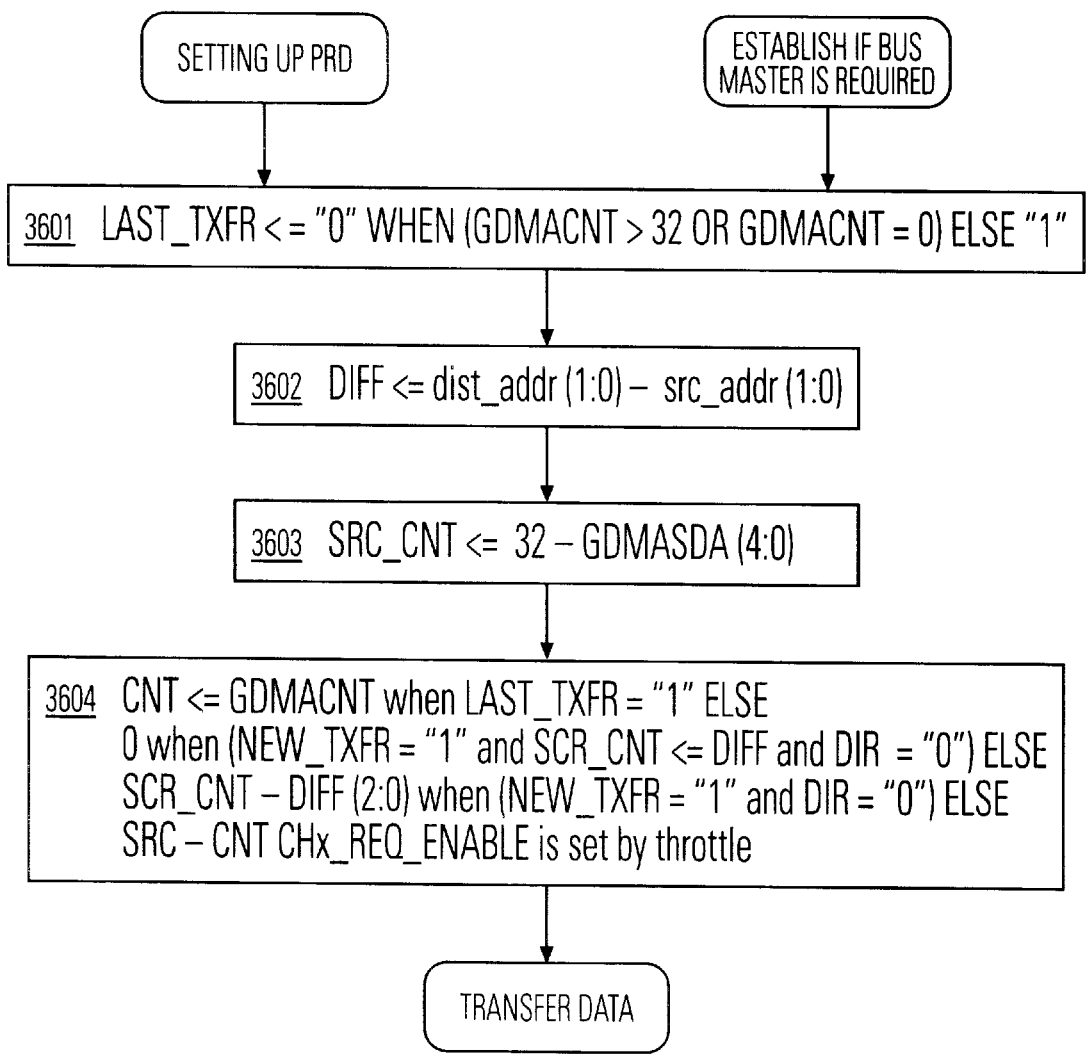
FIG. 36 illustrates one embodiment of steps included in the calculation of various transaction parameters of a DMA method.

FIG. 36 illustrates one embodiment of step 3330 of GDMA method 3300. In step 3601 a last transfer status indicator for a particular PRD (e.g., LAST_TXFR) is set to a logical "0" when the amount of information to be transmitted is greater than 32 bytes or equal to zero (e.g., the value in GDMACNT is greater than 32 or equal to 0). Otherwise the last transfer status indicator for the particular PRD (e.g., LAST_TXFR) is set to "1". An address differential variable (e.g., DIFF) is set in step 3602 to the last two bits of a destination address (e.g., dst_addr(1:0)) minus the last two bits of a source address (src_addr(1:0)). A source count variable (e.g., SRC_CNT) is computed in step 3603 to equal 32 bytes minus the last 5 bits of an address of in a main memory (e.g., 32 minus GDMASDA (4:0)). In step 3604 an indicator variable of the amount of bytes remaining to be transferred is established. When a last transfer status indicator for a particular PRD (e.g., LAST_TXRF) is equal to "1" a count of remaining bytes to be transferred for the particular PRD (e.g., CNT) is equal to a value in a register that stores a value from a PRD list. If a last transfer status indicator for a particular PRD (e.g., LAST_TXRF) is not equal to "1", count of remaining bytes to be transferred for the particular PRD (e.g., CNT) is set to 0 when a new transaction indicator (e.g., NEW_TXFR) is set to "1" and source count variable (e.g., SRC_CNT) is equal to an address differential variable (e.g., DIFF) and DIR is equal to "0". If the new transaction indicator (e.g., NEW_TXFR) is equal to "1" and DIR is equal to "0" then the count of remaining bytes to be transferred for the particular PRD (e.g., CNT) is set to the source count variable (e.g., SRC_CNT) minus an address differential variable (e.g., DIFF (2:0)). If none of the above conditions exist, the count of remaining bytes to be transferred for the particular PRD (e.g., CNT) is set to the source count variable (e.g., SRC_CNT). Also in step 3604 a channel request enable (CHx_REQ_ENABLE) is set by a throttle value.

Figure 37:
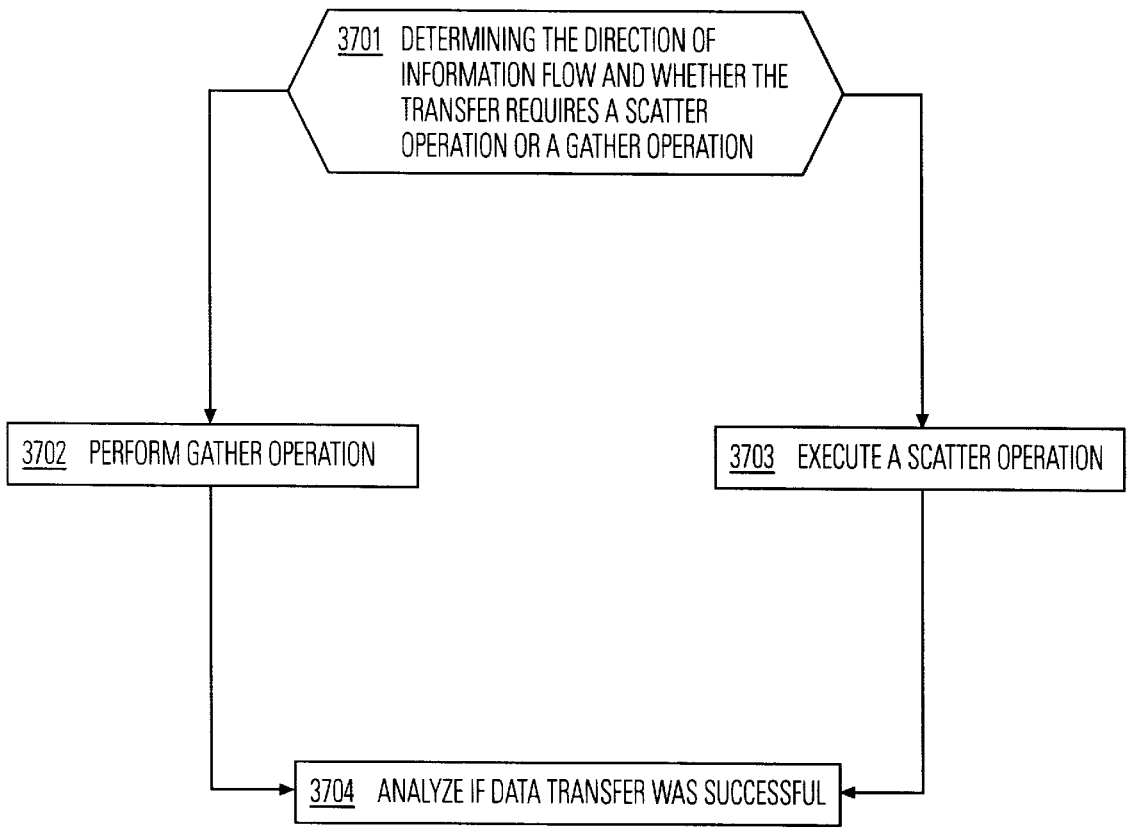
FIG. 37 illustrates one embodiment of steps included in transferring data in a DMA method of the present invention.

FIG. 37 illustrates one embodiment of step 3340 of GDMA method 3300 in which data is transferred. In step 3701 GDMA method 3300 determines which direction information is flowing by examining a variable indicating the direction of information flow (e.g., is DIR is set to "1"). If the variable indicating the direction of information flow indicates that a gather operation is occurring the process proceeds to step 3702 in which a gather operation is performed in which data is retrieved from scattered locations in a main memory and transmitted into a concatenated stream of information. If the variable indicating the direction of information flow indicates that a scatter operation is occurring in step 3701 the process proceeds to step 3704 and a scatter operation is performed. After a gather operation in step 3702 or a scatter operation in step 3703 is performed the process proceeds to step 3704. In step 3704 GDMA method 3300 analyzes if the data transfer was successful.

Figure 38:
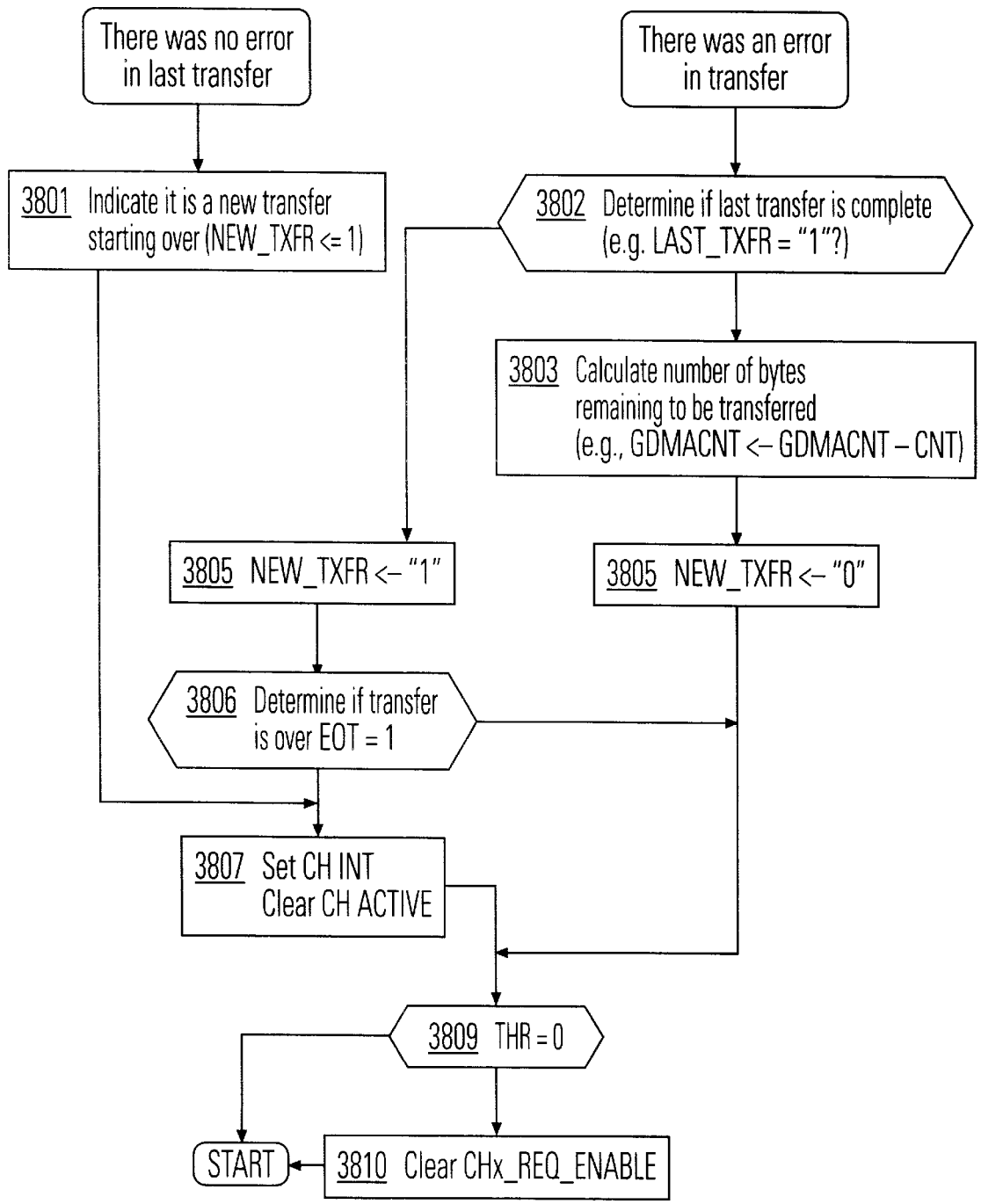
FIG. 38 is an illustration of one embodiment of steps included in determining if a data transfer was successful in one embodiment of a present invention DMA method.

Referring again to GDMA method 3300 illustrated in FIG. 33, in step 3350 the controls for the next transfer are reset. FIG. 38 is an illustration of one embodiment of step 3350 of GDMA method 3300. If step 3340 indicates a transfer was complete with no errors a variable indicating a new transfer is occurring is set in step 3801. For example NEW_TXFR is set to "1". After setting the variable indicating a new transfer is occurring the process proceeds to step 3807. If step 3340 indicates there is an error in a transfer, step 3802 determines if the last transfer for the current PRD is complete (e.g., if LAST_TXFT is set to "1"). If the last transfer is complete the process proceeds to 3804 and a new transfer indicator is set to indicate a new transfer is occurring next. After step 3804 the method determines if a transfer is over for a particular PRD (e.g., is the EOT indicator set to a logical "1"). If the transfer for a particular PRD is not finished the process proceeds to step 3809. If the transfer for a particular PRD is finished a channel interrupt (CH INT) is set and a clear active channel signal (CH ACTIVE) is issued in step 3809. In step 3803 a register that stores a count of bytes remaining to be transferred from a particular PRD (e.g., GDMACNT) is set to a count of bytes remaining to be transferred from a particular PRD minus the (e.g., GDMACNT-CNT) and NEWTXFR is set to "0". In step 3809 a throttle variable (e.g., THR) is examined to determine if a throttle rate has been set. For example if THR equals "0" the process proceeds to the beginning again (step 3310) to establish if a bus master transfer is requested. If THR does not equal "0" a channel request enable is cleared and then the process proceeds to the beginning again, step 3310, to establish is a bus master transfer is requested.

Figure 39:
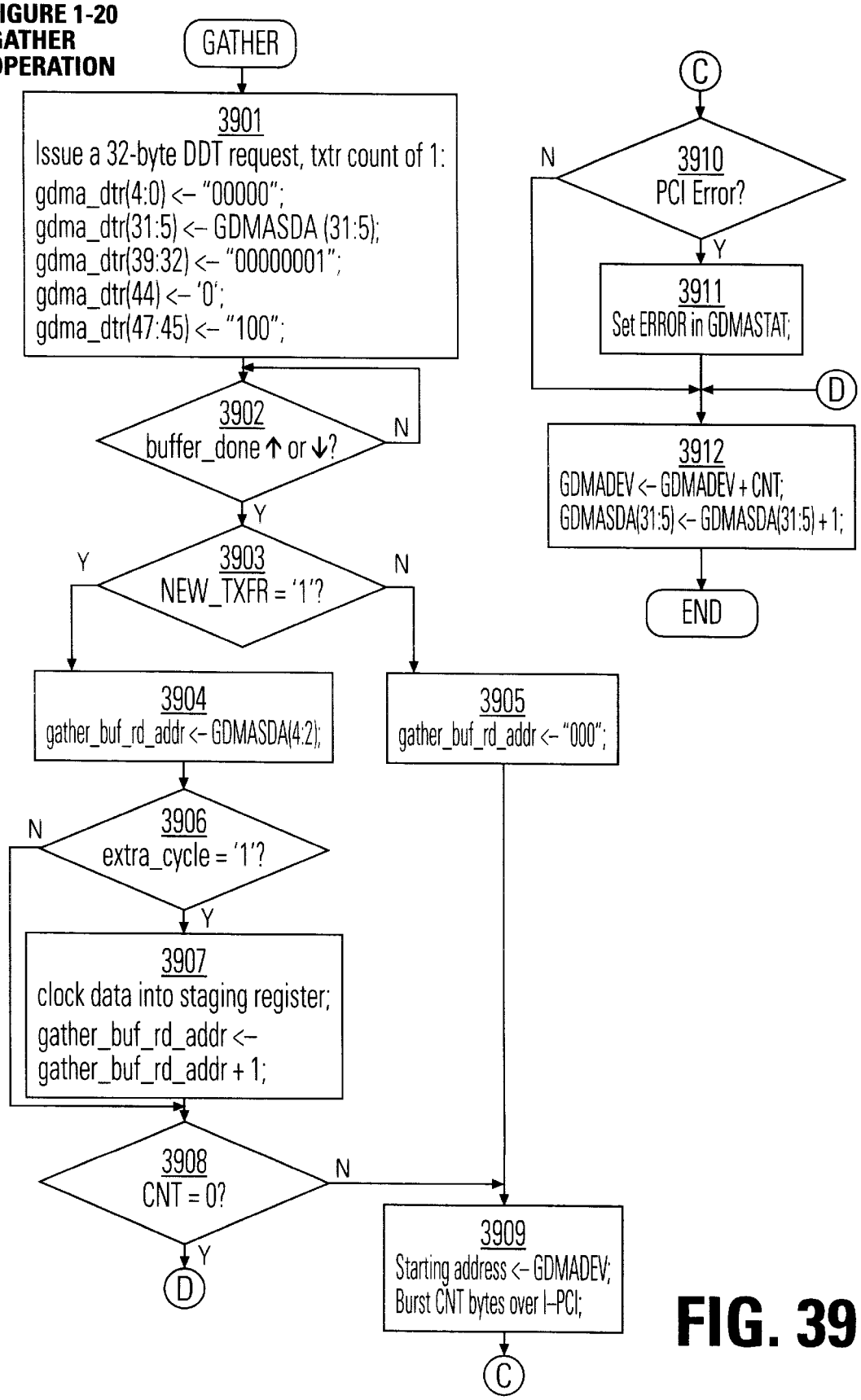
FIG. 39 is a flow chart illustrating the steps of a gather operation of the present invention.

FIG. 39 is a flow chart illustrating the steps of gather operation method 39, one embodiment of a gather operation of the present invention. In step 3901 a 32 byte DDT request is issued with a transfer count of 1. A gdma_dtr signal (4:0) is set to "00000", gdma_dtr signal (31:5) is set to the value in a SDRAM register (e.g., GDMASDA (31:5), gdma_dtr signal (39:32) is set to "00000001", gdma_dtr signal (44) is set to "0" and gdma_dtr signal (4:0) is set to "100". In step 3902 a toggle interface signal (buffer_done) from the SH4 clock zone to the asynchronous I-PCI clock zone is analyzed. If a signal a transition is detected in this signal a buffer operation on the SH4 side is done. In step 3903 the process analyzes if a new transfer is taking place (NEW_TXFR ="1"?). If a new transfer is taking place a gather buffer read address signal (gather_buffer_rd_addr) is set to GDMASDA (4:2) in step 3904. If a new transfer is not taking place, a gather buffer read address is set to "000" in step 3905. In step 06 an extra_cycle signal is analyzed to determine if it is set to "1". If the extra_cycle signal is set to "1" the process proceeds to step 3908. If the extra_cycle signal is not set to "1" the process proceeds to step 3907. In step 07 data is clocked into a staging register and the next gather buffer read address signal is set to the last gather buffer read address plus 1 (gather buf_rd_addr<-gather_buf_rd_addr+1). In step 3908 a count of remaining bytes to be transferred examined to determine if it is equal to 0 (e.g., CNT=0?). If a count of remaining bytes to be transferred is equal to 0 (e.g., CNT=0) then the process proceeds to step 3912. If a count of remaining bytes to be transferred is equal to 0 (e.g., CNT=0) then the process proceeds to step 3909. In step 3909 a starting address is set to GDMADEV and a burst of CNT bytes is transmitted over I-PCI. In step 3910 the method determines if there is a PCI error. For example in one embodiment ERROR is examined to determine if it is equal to "1". If it not equal to "1" the process proceeds to step !012. If it is equal to 1 the process proceeds to step !011. If there is no PCI error the process proceeds to step 3912. If there is a PCI error the ERROR bit in GDMASTAT is set in step 11 and then the process proceeds to step 3912. In step 12 GDMADEV is set to GDMADEV+CNT.

Figure 40:
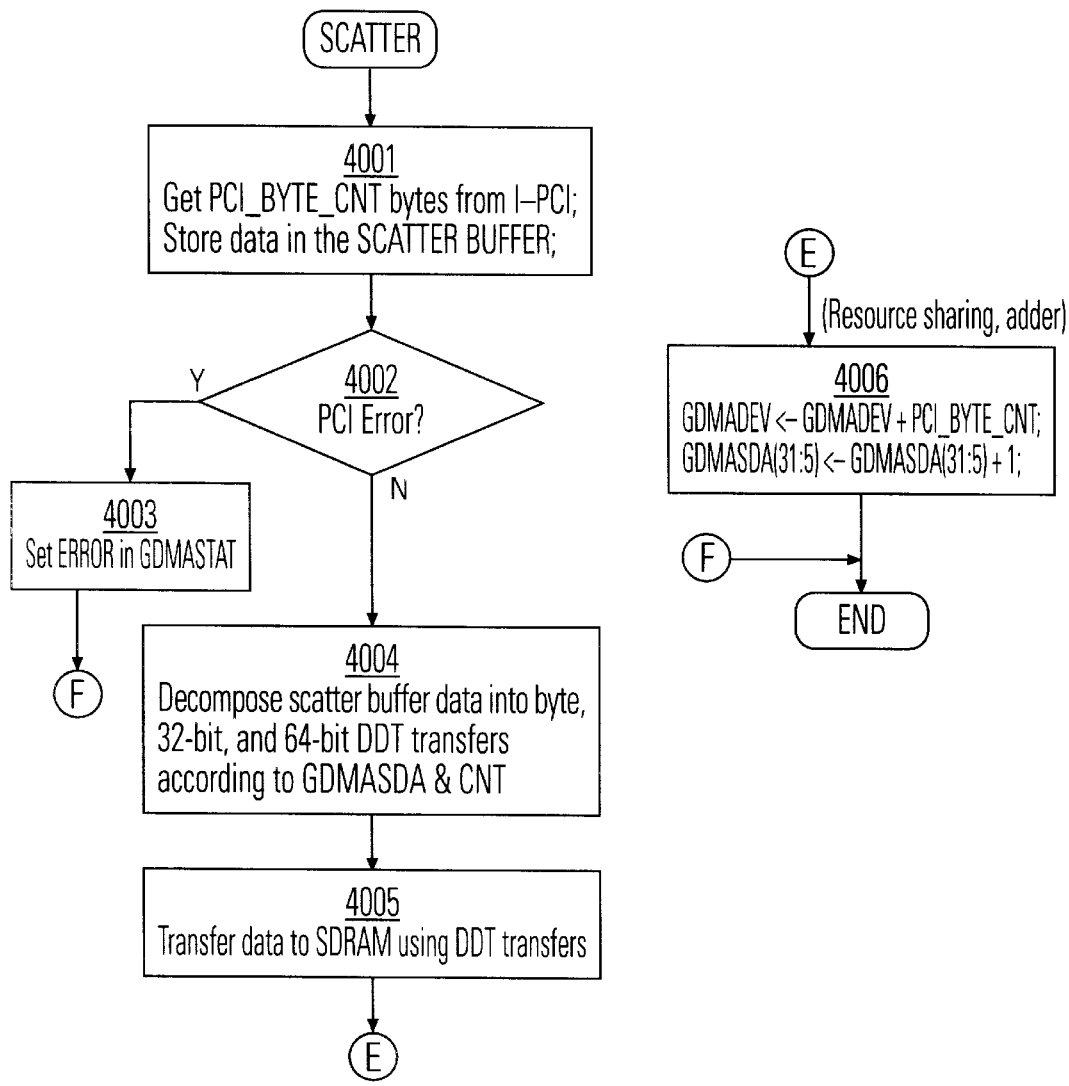
FIG. 40 is a flow chart illustrating the steps of a scatter operation method of the present invention.

FIG. 40 is a flow chart illustrating the steps of scatter operation method 4000 one embodiment of a scatter operation of the present invention. In step 4001 a count of PCI bytes (PCI_BYTE_CNT) are retrieved from I-PCI and data is stored in a scatter buffer (e.g., scatter buffer ???). In one embodiment PCI_BYTE_CNT is set to GDMACNT when a last transfer indicator is set to a logical 1 (LAST_TXFR= "1"). If a last transfer indicator is not set to a logical 1 and a new transfer indicator is set to a logical 1 (e.g., NEW_ TXFR="1") a source count indicator (SRC_CNT) plus a difference between a destination address and source address (e.g., DIFF). If neither the last transfer indicator does not indicate the last transfer is complete (e.g., LAST_TXFR= "1") and a new transfer indicator does not indicate it is a new transfer (e.g., NEW_TXFR="1") then PCI_BYTE_CNT is set to SRC_CNT. In step 4002 scatter operation method 400 determines if there is a PCI error. If there is not a PCI error the process proceeds to step 4004. If there is a PCI error the process proceeds to step 4003. In step 4003 set ERROR in GDMASTAT is set. After ERROR in GDMASTAT is set that process proceeds to the end of the scatter operation and picks up again in GDMA method 3300. In step 4004 the scatter buffer data is decomposed into byte, 32 bit & 64 bit DDT transfers according to GDMASDA & CNT. In step 4005 the data is transferred to SDRAM using the decomposition DDT transfers of step 4004. In step 4006 the next destination device address (GDMADEV) value is set to last destination device address plus a count of PCI bytes (GDMADEV plus PCI_BYTE_CNT) and the present SDRAM address is set to the past SDRAM address plus 1 (GDMASDA(31:5) is set to GDMASDA(31:5)+1)

In one embodiment of the present invention scatter buffer data has to be decomposed for efficient SH4 data transfers if the buffer is partially full. The data is broken down into transfer sizes that comply with requirements or limitations of the system in which the DMA of the present invention is utilized. The actual breakdown or decomposition depends on both the destination address and the number of data bytes in the scatter buffer. One embodiment of the present invention, a decomposition method determines if the amount of data in the scatter buffer is equal to or greater than the maximum transfer size of the system (e.g., a 32 byte burst). If the amount of data in the scatter buffer is greater than or equal to the maximum transfer size of the system it initiates a maximum size transfer (e.g., a 32 byte burst) If not the decomposition method determines if the amount of data in the scatter buffer is equal to or greater than the next or second largest transfer size of the system (e.g. a 64 bit or 8 byte transfer). If the amount of data in the scatter buffer is greater than or equal to the second largest transfer size of the system ,the decomposition method initiates as many full capacity second maximum size transfers (e.g., a 64 bit transfer) as possible. The decomposition method continues to check the amount of data remaining in the scatter buffer, decreasing the transfer size and using as many full capacity transfers as possible until all the information is transfer out of the scatter buffer.

In another embodiment of a decomposition method a determination is made regarding efficient tradeoffs of utilizing transfers of certain sizes. In some systems it does not necessarily optimize the overall efficiency of a communication transfer to utilize every possible transfer size. For example in one embodiment of the present invention a 16 bit word transfer size is not utilized. Instead the decomposition process skips down to and 8 bit (1 byte) size transfer.

Method 4100 is one embodiment of the present invention that determines how many bytes (txfr_cnt) are transferred in each access. An address of a source or destination is adjusted as the process proceeds through various iterations and bytes of information are transfer from one component to another. Method 4100 tracks how many bytes of information in a particular transfer remain and determines an optimal data transfer size for a particular access request or data transfer request.

The process starts at step 4101. Step 4101 is initiated in response to a command in a scatter operation to decompose scatter buffer data. In one embodiment scatter buffer data is decomposed into 8 bit (1 byte), 32 bit (4 bytes) and 64 bit (8 bytes) DDT transfers according to a SDRAM address and a count of remaining bytes to be transferred (CNT).

In step 4102 starting address start_addr is initially set to a memory address in a register (e.g. GDMASDA(4:0)) and a remainder is set to the number of bytes remaining to be transferred (CNT (4:0)) stored in a register (e.g. GDMACNT). In this step Diff_1 is set to "1000" minus start_addr (1:0) and gdma_dtr(31:0) is set to the value in the memory address register and a starting address (e.g., GDMASDA (31:5) & start_addr (4:0).

In step 4103 remainder is examined to determine if it is equal to zero. In this step 4103 method 4100 is determining in there are any remaining bytes to be transferred. If remainder is equal to zero it means there are 32 bytes to be transferred and the process proceeds to step 4114. If it is not equal to zero the process proceeds to step 4104.

In step 4104 the last three bits of start_addr (2:0) are examined to determine if they are set to "000". If they are set to "000" it means a piece of information starts on an address boundary that is a multiple of 8 bytes. If the last three bits start_addr (2:0) are set to "00" the process proceeds to step 4110. If the last three bits start_addr (2:0) are not set to "000" the process proceeds to step 4105.

In step 4105 it is determined the last two bits of start_addr (1:0) is equal to "00". If it is equal to "00" it means a piece of information starts on an address boundary that is a multiple of 4 bytes. If the last two bits of start_addr (1:0) is not equal to "00" the process proceeds to step 15. If start_addr (1:0) is equal to "00" the process proceeds to step 4106.

In Step 4106 the second bit of remainder(2) is examined to determine if it is equal to "1". If it is equal to "1" it means there are 9 to 16 or 25 to 32 bytes remaining to be transferred If the second bit of remainder(2) is not equal to 1 the process proceeds to step 4115. If the second bit of remainder(2) is equal to 1 the process proceeds to step 4107.

In Step 4107 a 32 bit DDT is engaged transmitting 4 bytes and with a transfer count (txfr_cnt) of 1. After the information has been transmitted the process proceeds to step 4108.

In Step 4108 the bit in position 2 of remainder(2) is set to '0' meaning there are 1 to 8 bytes or 17 to 25 bytes left to transfer. In addition, the start address (start_addr) is set to start_addr plus "00100" and the process proceeds to step 4109.

In Step 4109 remainder is examined to determine if it is equal to 0. If it is not equal to 0 the process proceeds to step 4115. If remainder is equal to 0 the process proceeds to step 4119.

In Step 4110 the bits in position 4 and 3 of remainder (4:3) are examined to determine if they are set to "00". If the bits in position 4 and 3 of remainder (4:3) are set to "00" the process proceeds to step 4106. If the first two bits of remainder (4:3) are not set to "00" the process proceeds to step 4111.

In Step 4111 a 64 bit DDT is sent with the number of transfers indicated by bits 4 and 3 of remainder (4:3) and txdr_cnt is set to bit 4 and 3 of remainder (4:3). The process then proceeds to Step 4112.

In Step 4112 remainder (4:3) is set to "00" and start_addr is set to start_addr plus txfr_cnt & "000". The process proceeds to Step 4113.

In Step 4113 remainder is examined to determine if it is equal to 0. If remainder is not equal to 0 the process proceeds to Step 4106. If the remainder is equal to 0 the process proceeds to Step 4119.

In Step 4114 a 32 byte DDT transmission is sent and txfr_cnt is set to 1. The process then proceeds to Step 4119.

In Step 4115 remainder is examined to determine if it less than diff_1. If the remainder is not less diff_1 the process proceeds to step 4117. If the remainder is less diff_1 the process proceeds to step 4116.

In Step 4116 a Byte DDT is transmitted and txfr_cnt is set to remainder. After the byte DDT is sent the process proceeds to Step 4119.

In Step 4117 a Byte DDT is transmitted and txfr_cnt is set to diff_1 (1:0).

In Step 4118 remainder is set to remainder minus txfr_cnt. In Step 4118 start_addr (4:2) is set to start_addr (4:2) plus 1 and start_addr (1:0) is set to "00". The process then proceeds to Step 4104.

In Step 4119 buffer done is set to not buffer done and the process proceeds to step 4120. Step 4120 is the end.

Thus, the system and method of the present invention provides a system and method that implements scatter and gather operations to conveniently and efficiently transfer information between a source and destination, including data that does not line up on a natural memory boundary or has mismatched byte alignments. In one embodiment the present invention utilizes physical region descriptor (PRD) lists along with merging and rotation logic to expediently communicate information and facilitate smooth streaming of data. The electronic system and method of the present invention maximizes utilization of available capacity of intermediate communication bursts. It also minimizes the number of adverse memory accesses when data is not a length directly supported by an electronic system's hardware. The present invention is capable of transferring the data to a byte boundary alignment at both a source and a destination.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A direct memory access engine comprising:
   a memory storage device adapted to store a physical region descriptor (PRD), said physical region descriptor describes a starting address of a section of data and the amount of data stored in a contiguous space following said starting address; and
   a direct memory access circuit coupled to said memory storage device, said direct memory access circuit includes:
      a data assembler, said data assembler adapted to rotate bytes of said data to compensate for misalignment between a source address and a destination address and merge said data in a manner that delivers said data in a concatenated stream;
      a scatter buffer coupled to said data assembler, said scatter buffer adapted to facilitate scatter transfer operations in which information is transferred to scattered locations in a main memory; and
      a gather buffer coupled to said data assembler, said gather buffer adapted to facilitate gather transfer operations in which information is gathered from scattered locations in a main memory.

2. A direct memory access engine of claim 1 further comprising:
- a control register group coupled to said gather buffer, said control register group adapted to store information related to the control and operations of said direct memory access engine; and
- a main state machine coupled to said control register group, said main state machine adapted to direct the operations of said direct memory access engine.

3. A direct memory access engine of claim 2 further comprising:
- a channel select and throttle control logic component coupled to said control register group, said channel select and throttle control logic component adapted to select a channel and a throttle level to pace the rate of said transfer.

4. A direct memory access engine of claim 2 wherein said control group comprises:
- a command register coupled to said state machine, said command register adapted to store information regarding the start, stop and direction of bus master operations; and
- a throttle register coupled to said channel select and throttle control logic component, said throttle register adapted to store information regarding the selection of a throttle level to pace the rate of said transfer.

5. A direct memory access engine of claim 2 wherein said control register group comprises:
- a status register coupled to said state machine, said status register adapted to store information indicating said direct access machine is active transferring information associated with said PRD, an error has transpired that prevents said transfer of said information, and an interrupt has been triggered by the transfer completion of said transfer.

6. A direct memory access engine of claim 2 wherein said control register group comprises:
- a descriptor table pointer register coupled to said state machine, said descriptor table pointer register adapted to store the base address of a descriptor table including said PRD.

7. A direct memory access engine of claim 2 wherein said control register group comprises:
- a device memory address register coupled to said state machine, said device memory address register is a memory location in an external bus space that is a destination when information is flowing from a main memory to a device and is a source when information is flowing from a device to a main memory.

8. A direct memory access engine of claim 2 wherein said control register group comprises:
- a memory address register coupled to said gather buffer, said main memory address register adapted to store an address in a main memory that facilitates the processing of transfers of said data to a destination.

9. A direct memory access engine of claim 2 wherein said control register group comprises:
- a remaining transfer count register coupled to said gather buffer, said remaining count register adapted to store byte count information retrieved from said PRD.

10. A direct memory access engine of claim 1 wherein said data assembler further comprises:
- data rotation and merging logic adapted to rotate bytes of said data to compensate for misalignment between a source address and a destination address, said rotation is adapted to merge said data in a manner that delivers said data in a concatenated stream; and
- staging registers coupled to said data rotation and merging logic, said staging registers adapted to facilitate said rotation and merging logic by temporarily storing data during rotation.

11. A direct memory access engine of claim 10 wherein said data assembler further comprises:
- a multiplexer coupled to said staging registers, said multiplexer adapted to select a byte of information to be forwarded to another component of said direct memory access engine.

* * * * *